US012236773B2

(12) United States Patent
Trundle et al.

(10) Patent No.: US 12,236,773 B2
(45) Date of Patent: Feb. 25, 2025

(54) MONITORING SYSTEM CONTROL TECHNOLOGY USING MULTIPLE SENSORS, CAMERAS, LIGHTING DEVICES, AND A THERMOSTAT

(71) Applicant: Alarm.com Incorporated, Tysons, VA (US)

(72) Inventors: Stephen Scott Trundle, Falls Church, VA (US); Alison Jane Slavin, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 194 days.

(21) Appl. No.: 17/882,795

(22) Filed: Aug. 8, 2022

(65) Prior Publication Data

US 2022/0375318 A1 Nov. 24, 2022

Related U.S. Application Data

(63) Continuation of application No. 16/858,903, filed on Apr. 27, 2020, now Pat. No. 11,410,535, which is a
(Continued)

(51) Int. Cl.
*G08B 29/02* (2006.01)
*G08B 13/00* (2006.01)
(Continued)

(52) U.S. Cl.
CPC ............. *G08B 29/02* (2013.01); *G08B 13/00* (2013.01); *G08B 13/19602* (2013.01);
(Continued)

(58) Field of Classification Search
CPC .. G08B 29/02; G08B 13/00; G08B 13/19602; G08B 13/19656; G08B 13/19684;
(Continued)

(56) References Cited

U.S. PATENT DOCUMENTS

| 6,400,265 B1 | 6/2002 | Saylor et al. |
| 6,661,340 B1 | 12/2003 | Saylor et al. |

(Continued)

FOREIGN PATENT DOCUMENTS

EP 1097409 5/2005

OTHER PUBLICATIONS

Office Action issued in U.S. Appl. No. 12/782,633 on Oct. 29, 2012, 7 pages.
(Continued)

*Primary Examiner* — Omar Casillashernandez
(74) *Attorney, Agent, or Firm* — Fish & Richardson P.C.

(57) ABSTRACT

Techniques are described for providing control of a monitoring system (e.g., a home alarm or security system) using one or more mobile devices. In some implementations, a native mobile device application enables use of a mobile device as a security/automation system keypad and controller for a home security system. In these implementations, the mobile device, using the native mobile device application, checks real time status of system and sensors, arms/disarms system, turns lights on/off, looks in on live video of security cameras, reviews history of system events, reviews saved video clips, monitors/changes thermostat settings, and performs other features of a traditional security keypad in a home security system.

21 Claims, 11 Drawing Sheets

Related U.S. Application Data continuation of application No. 16/449,543, filed on Jun. 24, 2019, now Pat. No. 10,636,284, which is a continuation of application No. 16/145,892, filed on Sep. 28, 2018, now Pat. No. 10,332,387, which is a continuation of application No. 15/405,556, filed on Jan. 13, 2017, now Pat. No. 10,127,798, which is a continuation of application No. 14/665,277, filed on Mar. 23, 2015, now Pat. No. 9,547,963, which is a continuation of application No. 13/735,193, filed on Jan. 7, 2013, now Pat. No. 8,988,215, which is a continuation of application No. 12/782,633, filed on May 18, 2010, now Pat. No. 8,350,694.

(60) Provisional application No. 61/179,215, filed on May 18, 2009.

(51) Int. Cl.
| | |
|---|---|
| *G08B 13/196* | (2006.01) |
| *G08B 25/08* | (2006.01) |
| *G08B 25/10* | (2006.01) |
| *G08B 25/14* | (2006.01) |
| *H04W 4/50* | (2018.01) |
| *H04W 4/80* | (2018.01) |
| *H04W 88/02* | (2009.01) |

(52) U.S. Cl.
CPC .. *G08B 13/19656* (2013.01); *G08B 13/19684* (2013.01); *G08B 13/19691* (2013.01); *G08B 25/08* (2013.01); *G08B 25/10* (2013.01); *G08B 25/14* (2013.01); *H04W 4/50* (2018.02); *H04W 4/80* (2018.02); *H04W 88/02* (2013.01)

(58) Field of Classification Search
CPC .. G08B 13/19691; G08B 25/08; G08B 25/10; G08B 25/14; H04W 4/50; H04W 4/80; H04W 88/02
USPC .......................................................... 340/506
See application file for complete search history.

(56) References Cited

U.S. PATENT DOCUMENTS

| | | | |
|---|---|---|---|
| 7,113,090 B1 | 9/2006 | Saylor et al. | |
| 7,209,916 B1 | 4/2007 | Seshadri et al. | |
| 7,634,263 B2 | 12/2009 | Louch et al. | |
| 7,711,796 B2 | 5/2010 | Gutt et al. | |
| 7,894,807 B1 | 2/2011 | Drennan | |
| 7,911,341 B2 | 3/2011 | Raji et al. | |
| 8,073,931 B2 | 12/2011 | Dawes et al. | |
| 8,155,630 B2 | 4/2012 | Scott et al. | |
| 8,175,617 B2 | 5/2012 | Rodriguez | |
| 8,255,256 B2 | 8/2012 | Haynes et al. | |
| 8,335,842 B2 | 12/2012 | Raji et al. | |
| 8,350,694 B1 | 1/2013 | Trundle et al. | |
| 8,379,870 B2 | 2/2013 | Nicolino, Jr. et al. | |
| 8,473,619 B2 | 6/2013 | Baum et al. | |
| 8,493,220 B2* | 7/2013 | Virtanen | A61B 5/4812 340/575 |
| 8,515,397 B2 | 8/2013 | Gatti et al. | |
| 8,538,376 B2 | 9/2013 | Lee et al. | |
| 8,620,858 B2 | 12/2013 | Backholm et al. | |
| 8,635,350 B2 | 1/2014 | Gutt et al. | |
| 8,891,525 B2 | 11/2014 | Addy | |
| 8,988,215 B1 | 3/2015 | Trundle et al. | |
| 9,049,307 B2 | 6/2015 | Tyroler et al. | |
| 9,128,829 B2 | 9/2015 | Corda et al. | |
| 9,141,276 B2* | 9/2015 | Dawes | G08B 13/22 |
| 9,547,963 B1 | 1/2017 | Trundle et al. | |
| 10,127,798 B1 | 11/2018 | Trundle et al. | |
| 10,313,303 B2 | 6/2019 | Baum et al. | |
| 10,332,387 B1 | 6/2019 | Trundle et al. | |
| 10,636,284 B1 | 4/2020 | Trundle et al. | |
| 11,410,535 B1 | 8/2022 | Trundle et al. | |
| 2005/0216580 A1 | 9/2005 | Raji et al. | |
| 2008/0309449 A1 | 12/2008 | Martin et al. | |
| 2009/0009326 A1 | 1/2009 | Veiga | |
| 2009/0029681 A1 | 1/2009 | Clemow et al. | |
| 2009/0062964 A1 | 3/2009 | Sullivan et al. | |
| 2009/0066488 A1 | 3/2009 | Qiahe et al. | |
| 2009/0070436 A1 | 3/2009 | Dawes et al. | |
| 2009/0121861 A1 | 5/2009 | Latham et al. | |
| 2009/0181640 A1* | 7/2009 | Jones | G08B 25/08 455/404.2 |
| 2009/0288131 A1 | 11/2009 | Kandekar et al. | |
| 2009/0315699 A1* | 12/2009 | Satish | H04L 45/3065 340/533 |
| 2011/0221913 A1 | 9/2011 | Nagai et al. | |
| 2012/0260184 A1 | 10/2012 | Dawes et al. | |
| 2015/0310845 A1* | 10/2015 | Chan | G10K 11/17873 381/71.8 |

OTHER PUBLICATIONS

Notice of Allowance issued in U.S. Appl. No. 12/782,633 on Nov. 9, 2012, 5 pages.
U.S. Non-Final Office Action for U.S. Appl. No. 13/735,193 dated Nov. 20, 2013, 12 pages.
Revised Suggestion of an Interference under 37 CFR §41.202(a) filed Feb. 24, 2014 for U.S. Appl. No. 13/311,365, 73 pages.
USPTO PTAB Declaration of Interference entered Mar. 31, 2014 for U.S. Appl. No. 13/311,365, 91 pages.
IControl Motion 1 and Supporting Exhibits for Patent Interference No. 106,001 filed Jul. 1, 2014, 1058 total pages.
IControl Opposition to Motion 1 and Supporting Exhibits for Patent Interference No. 106,001, filed Sep. 2, 2014, 365 total pages.
IControl Opposition to Motion 3 and Supporting Exhibits for Patent Interference No. 106,001, filed Sep. 2, 2014, 309 total pages.
IControl Reply to Opposition of iControl Motion 1 for Patent Interference No. 106,001, filed Oct. 7, 2014, 47 total pages.
Exhibit 1002—Resume of J. Tipton Cole for Patent Interference No. 106,001, filed Jul. 1, 2014, 5 pages.
Exhibit 1003—First Declaration of Tipton Cole for Patent Interference No. 106,001, filed Jul. 1, 2014, 201 pages.
Exhibit 1004—U.S. Appl. No. 11/084,232 to Raji et al., filed Mar. 16, 2005, 67 pages.
Exhibit 1007—U.S. Appl. No. 12/197,895 to Dawes et al., filed Aug. 25, 2008, 109 pages.
Exhibit 1010—iControl Application User Guide for iPhones (Release 3.2), copyright 2008 iControl Networks, Inc., 27 pages.
Exhibit 1011—First Declaration of Paul Dawes for Patent Interference No. 106,001, filed Jul. 1, 2014, 5 pages.
Exhibit 1012—Peter Burrows, Bloomberg Businessweek article entitled "Kleiner's Pick for the Killer iPhone App," May 27, 2008, 3 pages.
Exhibit 1013—John Markoff et al., New York Times article entitled "Apple's Latest Opens a Developer's Playground," Jul. 10, 2008, 3 pages.
Exhibit 1016—Apple iPhone User's Guide, 2008, 130 pages.
Exhibit 1018—U.S. Appl. No. 60/955,172, filed Aug. 10, 2007, 16 pages.
Exhibit 1019—U.S. Appl. No. 60/987,359, filed Nov. 12, 2007, 22 pages.
Exhibit 1020—U.S. Appl. No. 60/987,366, filed Nov. 12, 2007, 31 pages.
Exhibit 1021—Email thread received by Paul Dawes from Marc Baum and Kevin Kraemer dated Dec. 17, 2008, Re: system version 3.2 release, 2 pages.
Exhibit 1023—David Appleyard, Article entitled "9 Remote Control Apps for the iPhone," Jun. 25, 2009, retrieved from the Internet: http://mac.appstorm.net/roundups/iphone-roundups/9-remote-control-apps-foriphone/, 4 pages.
Exhibit 1024—Article entitled "Psiloc Infrared Remote Control (Symbian)," Aug. 28, 2007, retrieved from the Internet: http://download.cnet.com/Psiloc-Infrared-Remote-Control-Symbian/3000-2064 4-10730991.html, 1 page.

(56) References Cited

OTHER PUBLICATIONS

Exhibit 1025—Antonio Wells, Article entitled "Remote RDP," Sep. 18, 2009, retrieved from the Internet: http://www.androidtapp.com/remote-rdp/, 3 pages.
Exhibit 1026—Article entitled "10 Best Security Apps for Your iPhone," Oct. 16, 2009, retrieved from the Internet: http://security-today.com/articles/2009/10/09/10-best-security-apps-for-youriphone.aspx, 4 pages.
Exhibit 1027—John Walton, Article entitled "Android App Review: Gmote," Mar. 18, 2009, retrieved from the Internet: http://www.phonedog.com/2009/03/18/android-app-review-gmote/, 3 pages.
Exhibit 1028—Simon Ng, Article entitled How to Use Veency to Remote Control Your iPhone, Oct. 19, 2008, retrieved from the Internet: http://www.simonblog.com/2008/10/19/how-to-use-veency-toremote-control-your-iphone/, 5 pages.
Exhibit 1030—Article entitled "iPhone Home Security App," Aug. 27, 2009, retrieved from the Internet: http://homesecuritysource.wordpress.com/2009/08/27/iphone-home-security-app/, 1 page.
Exhibit 1031—Jan Magne Tjensvold, "Mobile Control System for Location Based Alarm Activation." Master's thesis, Dept. of Electrical Engineering and Computer Science, University of Stavanger, Norway. Jun. 16, 2008. (http://brage.bibsys.no/xmlui/handle/11250/181677), 48 pages.
Exhibit 1032—Josh Lowensohn, Article entitled "DIY home surveillance with a Webcam," Aug. 3, 2009, retrieved from the Internet: http://www.alarmsystemreviews.com/unbiased-nextalarm-customer-reviews.html, 6 pages.
Exhibit 1033—Article entitled "Get Email Alerts when Alarm Sounds," Feb. 23, 2009, retrieved from the Internet: http://homecontrolsblog.wordpress.com/2009/02/23/web-based-monitoring-andalarm-notification/, 1 page.
Exhibit 1034—Wikipedia article entitled "JavaScript" at http://en.wikipedia.org/wiki/JavaScript, 19 pages.
Exhibit 1035—Blog at http://blog.jquery.com/2008/09/28/jquery-microsoft-nokia/, 1 page.
Exhibit 1036—Adam Connors, blog at http://googlemobile.blogspot.com/2008/07/google-talk-for-iphone.html, Jul. 2, 2008, 1 page.
Exhibit 1037—Dr. Drang, Local HTML and JavaScript on the iPhone, http://www.leancrew.com/all-this/2008/11/local-html-and-javascript-on-theiphone/, Nov. 7, 2008, 6 pages.
Exhibit 1038—Negrino and Smith, "JavaScript and AJAX For the Web," Sixth Edition, PeachPit Press, 2007, pp. 1-9, and Appendix A (pp. 443-466).
Exhibit 1058—Web page with URL of http://phonegap.com/about/faq/, 2 pages.
Exhibit 1057—Transcript, Deposition of Tipton Cole for Patent Interference No. 106,001, filed Aug. 11, 2014, 95 pages.
Exhibit 1055—Melanson Preliminary Motion #2 (Designating claims 7-9 as not corresponding to the count), Patent No. Interference 105,196, Paper 32, dated Jan. 24, 2005, 9 pages.
Exhibit 1042—U.S. Appl. No. 13/311,365 to Dawes et al., filed Dec. 5, 2011, 106 pages.
Exhibit 1043—Second Declaration of Tipton Cole for Patent Interference No. 106,001, filed Sep. 2, 2014, 92 pages.
Exhibit 1044—"Wireless Definition and Solutions-CIO" (2007), retrieved from the Internet: http://www.cio.com/article/2439275/mobile/wireless-definition-and-solutions.html[Aug. 19, 2014], 10 pages.
Exhibit 1045—HP EliteBook 2740p Tablet Pc, A Twist of This. A Touch of That, Jan. 2010, 4 pages.
Exhibit 1046—iPhone App Store: 15,000 apps, 500 million served, Jan. 20, 2009, retrieved from the Internet: http://www.cnet.com/news/itunes-app-store-1 5000-apps-500-million - . . . , 1 page.
Exhibit 1047—Z-Wave iPhone Apps Elevate Consumer Demand for "Mobile" Home, Jan. 4, 2010, retrieved from the Internet: http://www.bloomberg.com/apps/news?pid=newsarchive&SID=a6MGSK5KR7KQ, 3 pages.
Exhibit 1048—Peter Rojas, "VIA intros NanoBook Ultra Mobile Device—$600 ultraportable laptop" engadget.com (2007), retrieved from the Internet: http://www.engadget.com/2007/06/05/via-intros-nanobook-ultra-mobile-device-600-ultraportable-lap/, 3 pages.
Exhibit 1049—Jason Kincaid, Apple Has Sold 450,000 iPads, so Million iPhones To Date, Apr. 8, 2010, retrieved from the Internet: http://techcrunch.com/2010/04/08/apple-has-sold-450000-ipads-50-million-iphones-to-date/, 2 pages.
Exhibit 1050—Richard Wray, iPhone overtaken by Android in the US, May 10, 2010, retrieved from the Internet: http://www.theguardian.com/technology/2010/may/1, 3 pages.
Exhibit 1051—Preliminary Amendment filed with U.S. Appl. No. 13/311,365, filed Dec. 5, 2011, 5 pages.
Exhibit 1052—David Flanagan, Javascript: The Definitive Guide, 5th Edition, Flanagan, 2006, Chapter 1 (pp. 1-11).
Exhibit 1054—Melanson Preliminary Motion #1 (Designating claims 4-6 as not corresponding to the count) for Interference 105,196, Paper 31, dated Jan. 24, 2005, 9 pages.
Exhibit 1059—Web page with URL of http://stackoverflow.com/questions/10397189/usinghtml5-geolocation-api-with-android-2-0-browser and put it on a website that Icontrol (tipton.com/gps.html), Jul. 2, 2012, 3 pages.
Exhibit 1060—DroidScript, Web page with URL of http://droidscript.blogspot.com/2010/04/androidcamerapreview-sample-in.html, Apr. 11, 2010, 3 pages.
Exhibit 1061—Jaber Al Nahian, Access and Control Your Android From Web Browser Remotely Using AirDroid, Web page with URL of http://www.techgainer.com/access-manage-controlandroid-from-web-browser-over-air-remotely/, Jul. 9, 2014, 3 pages.
Exhibit 1062—Kevin Krause, Access Your Android Phone from Your Browser Using LazyDroid, Web page with URL of http://phandroid.com/2011/05/05/access-your-androidphone-from-your-browser-using-lazydroid/, May 5, 2011, 2 pages.
Exhibit 1063—Term of the Day, Internet Archive Techopedia website from Oct. 18, 2011. https://web.archive.org/web/20111018234925/http://www.techopedia.com/, 3 pages.
Exhibit 1064—Ex Parte Bayer Materialscience LLC and Bayer Materialscience AG, Appeal 2012-002767 (PTAB 2013), U.S. Appl. No. 11/472,000, Decision on Appeal, dated Apr. 16, 2013, 18 pages.
Exhibit 2004—First Declaration of Sam Malek, Ph.D., for Patent Interference No. 106, 001, filed Jul. 1, 2014, 51 pages.
Exhibit 2005—Declaration of Alison Slavin for Patent Interference No. 106, 001, filed Jul. 1, 2014, 9 pages.
Exhibit 2006—U.S. Appl. No. 13/735,193 as filed, 55 pages.
Exhibit 2007—Restriction Requirement dated Oct. 9, 2013 for U.S. Appl. No. 13/735,193, 8 pages.
Exhibit 2008—Non-final Office Action dated Nov. 20, 2013 for U.S. Appl. No. 13/735,193, 12 pages.
Exhibit 2012—HP OpenView, Using Network Node Manager, Ed. 1 (Apr. 1997).
Exhibit 2013—"HP OpenView 3.0 includes OSF DME technologies—Hewlett-Packard Co.'s OpenView version 3.0 systems management software supports the Open Software Foundation's Distributed Management Environment—New Products: Minicomputer—Brief Article—Product Announcement," Software Magazine (Sep. 1992), 1 page.
Exhibit 2014—Task 7—Using HP OpenView to Create the SNMP Framework, About HP OpenView, Basic Dial NMS Implementation Guide, 20 pages.
Exhibit 2015—HP OpenView Network Node Manager 5.0, Migration Guide (Apr. 1997), Hewlett Packard, 52 pages.
Exhibit 2016—HP OpenView Desktop Administrator, Alert Configuration Guide, HP Part No. J1212-90001, Sep. 1997, 65 pages.
Exhibit 2017—HP OpenView: A Manager's Guide (1997).
Exhibit 2018—Brilliant Living Pluto, Plutohome (2007), retrieved from the Internet: web.archive.org/web/20080319112803/http://plutohome.com/, 1 page.
Exhibit 2019—Brilliant Living Pluto, Get Pluto (2007), Sep. 10, 2013, retrieved from the Internet: web.archive.org/web/20071011003709/http://plutohome.com/index.php?section=get_pluto, 1 page.
Exhibit 2020—Plutohome_how it works, Sep. 10, 2013, retrieved from the Internet: web.archive.org/web/20071022040243/tttp:l/plutohome.com/indexphp?section=pluto_system_overview, 2 pages.

(56) References Cited

OTHER PUBLICATIONS

Exhibit 2021—Brilliant Living Pluto, How to use the mobile phone, Sep. 10, 2013, retrieved from the Internet: web.archive.org/web/20061224211042/http://plutohome.com/indexphp?section=learn_how_to_use_it#mobile), 1 page.
Exhibit 2022—Brilliant Living Pluto, Security, Sep. 10, 2013, retrieved from the Internet: web.archive.org/web/2007\1318175329/http://plutohome.com/indexphp?section=security, 1 page.
Exhibit 2023—Control LinuxMCE using a Symbian Series 60 mobile phone with B1, Sep. 10, 2013, retrieved from the Internet: web.archive.org/web/20080501033810/http://wiki.linuxmce.org/index.php/Controi_LinuxMCE_using_a_Symbian_Series_60_mobile_phone_wth_BI, 2 pages.
Exhibit 2024—Control LinuxMCE using a Windows device as an Orbiter, Sep. 10, 2013, retrieved from "http://wiki.linuxmce.org/index.php/Control_LinuxMCE_using_a_Windows_device_as_an_Orbiter", 1 page.
Exhibit 2025—Control LinuxMCE using other types of mobile phones, Bluetooth, Sep. 10, 2013, retrieved from the Internet: web.archive.org/web/20080423215023/http://wiki.linuxmce.org/index.php/Controi_LinuxMCE_using_other_types_of_mobile_phones, 2 pages.
Exhibit 2026—Mobile Orbitor, Sep. 10, 2013, retrieved from the Internet: web.archive.org/web/20080420060135/http://wiki.linuxmce.org/index.php/Mobile_Orbiter, 2 pages.
Exhibit 2027—Nokia 770, From LinuxMCE wiki, Sep. 10, 2013, retrieved from the Internet: web.archive.org/web/20080501033947/http://wiki.linuxmce.org/index.php/Nokia_770, 7 pages.
Exhibit 2028—Nokia N70, From LinuxMCE wiki, Sep. 10, 2013, retrieved from the Internet: web.archive.org /web/20080410082534/http://wiki.linuxmce.org/index.php/Nokia_N70, 1 page.
Exhibit 2029—Nokia N800, From LinuxMCE wiki. Sep. 10, 2013, retrieved from the Internet: web.archive.org/web/20080423054809/http://wiki.linuxmce.org/index.php/Nokia_N800, 3 pages.
Exhibit 2030—Orbiters, From LinuxMCE wiki, Sep. 10, 2013, retrieved from the Internet: web.archive.org/web/20080420164043/http://wiki.li nuxmce.org/index.php/Orbiters, 2 pages.
Exhibit 2031—Symbian mobile software, From LinuxMCE wiki, Sep. 10, 2013, retrieved from the Internet: web.archive.org/web/20080420060252/http://wiki.linuxmce.org/index.php/Symbian_mobile_software, 1 page.
Exhibit 2032—Jon "maddog" Hall, The Ultimate Linux Home, Sep. 10, 2013, retrieved from the internet at: delivery.acm.org/10.1145/1350000/134352619782.html?ip=76.240.203.42&id=1343526&acc=ACTIVE SERVICE&key=657220617AB7FFE853839BA65C03D3B9& . . . , 9 pages.
Exhibit 2033—User Manual, From LinuxMCE wiki, What is LinuxMCE, Sep. 10, 2013, retrieved from the Internet: web.archive.org/web/20080430153647/http://wiki.linuxmce.org/index.php/User's_Manual, 14 pages.
Exhibit 2034—What's an Orbiter, Sep. 10, 2013, retrieved from the Internet: web.archive.org/web/20080415203928/http://wiki.linuxmce.org/index.php/What's_an_Orbiter, 3 pages.
Exhibit 2035—Michael Mace, Mobile Opportunity, Mobile applications, RIP, retrieved from the internet: http://mobileopportunity.blogspot.com/2008/02/mobile-applications-rip.html[Jul. 1, 2014 11:21:51 AM], 53 pages.
Exhibit 2036—Mike Rowehl, This is Mobility, Native Mobile Apps vs Mobile Web Apps, retrieved from the internet: http://web.archive.org/web/20131101235205/http:/www.thisismobility.com/blog/2008/02/25/native-mobile-apps-vs-mobile-web-apps[Jul. 1, 2014 11:23:26 AM], 4 pages.
Exhibit 2037—Buckley and Carlo Longino, MOBHAPPY, Sounding the Death Knell for Native Mobile Apps, Jul. 1, 2014, retrieved from the internet: http://mobhappy.com/blog1/2008/02/25/sounding-the-death-knell-for-native-mobile-apps/, 3 pages.
Exhibit 2038—Dean Bubley, Disruptive Wireless: Standalone Mobile Apps vs Web Apps on Mobile, retrieved from the internet: http://disruptivewireless.blogspot.com/2008/02/standalone-mobile-apps-vs-web-apps-on.html Jul. 1, 2014, 6 pages.

Exhibit 2039—Office Action dated Jun. 18, 2014 for U.S. Appl. No. 13/735,193, 8 pages.
Exhibit 2040—Second Declaration of Sam Malek, Ph.D., for Patent Interference No. 106, 001 dated Jul. 1, 2014, 19 pages.
Exhibit 2041—Curriculum Vitae of Sam Malek for Patent Interference No. 106, 001, filed Jul. 1, 2014, 20 pages.
Exhibit 2042—Amendment dated Nov. 6, 2013 for U.S. Appl. No. 13/311,365, 18 pages.
Exhibit 2043—Stefan Brahler, Analysis of the Android Architecture, Jun. 2, 2010-Oct. 6, 2010, 52 pages.
Exhibit 2044—Mobile app definition from PC Magazine Encyclopedia, Aug. 26, 2014, retrieved from the internet: http://www.pcmag.com/encyclopedia/term/60015/mobile-app, 2 pages.
Exhibit 2045—Native mobile app definition from PC Magazine Encyclopedia, Aug. 26, 2014, retrieved from the internet: http:1!www.pcmag.com/encyclopedia/term/657051native-mobile-app, 2 pages.
Exhibit 2046—Definition—What does Mobile Application (Mobile App) mean?, Techopedia, Posted by: Cory Janssen (/contributors/cory-janssen), 1 page.
Exhibit 2047—Definition—What does Native Mobile App mean?, Techopedia, Posted by: Cory Janssen (/contributors/cory-janssen), 1 page.
Exhibit 2048—What is Data Synchronization—Webopedia, Aug. 27, 2014, retrieved from the internet: http://www.webopedia.com/TERM/D/data_synchronization.html, 2 pages.
Exhibit 2049—What is Web Browser (Browser)—Webopedia, Aug. 27, 2014, retrieved from the internet: http://www. webopedia.com/TERM/B/browser.html, 2 pages.
Exhibit 2050—Oral Deposition of J. Tipton Cole for Patent Interference No. 106, 001 dated Aug. 11, 2014, 93 pages.
Exhibit 2051—Andre Charland et al., Mobile Application Development: Web vs. Native, May 2011, vol. 54, No. 5, Communication of the ACM, pp. 49-53.
Exhibit 2052—Third Declaration of Sam Malek for Patent Interference No. 106, 001 dated Sep. 2, 2014, 32 pages.
Exhibit 2053—Alarm.com Blackberry Specs, Sep. 2008, Alarm.com Proprietary & Confidential, Version 1.0, 27 pages.
Exhibit 2054—Email Subject: Blackberry from Dave Hutz to Brandon O'Rourke dated Oct. 31, 2008, 1 page.
Exhibit 2055—Email Subject: RE BlackBerry Versions from Alison Slavin to Brandon O'Rourke dated Nov. 13, 2008, 2 pages.
Exhibit 2056—Screenshots with code modified dates, 10 pages.
Exhibit 2057—Email Subject: RE BlackBerry Specs from Dave Hutz to Brandon O'Rourke and Alison Slavin dated Dec. 12, 2008, 3 pages.
Exhibit 2058—Blackberry App Specs Take 2, Jan. 21, 2008, 10 pages.
Exhibit 2059—Blackberry App, Jan. 26, 2009, 7 pages.
Exhibit 2060—AlarmMobile.java upload screenshot, log messages from Oct. 10, 2009 to Oct. 10, 2009, 1 page.
Exhibit 2061—U.S. Appl. No. 61/179,215, filed May 18, 2009, 13 pages.
Exhibit 2062—Declaration of Brandon O'Rourke for Patent Interference No. 106, 001 dated Sep. 2, 2014, 5 pages.
Exhibit 2063—Declaration of Alison Slavin for Patent Interference No. 106, 001 dated Sep. 2, 2014, 11 pages.
Exhibit 2064—Mobile Apps: HTML5 vs Native, retrieved from the internet: http://meetings-conventions.com/blogs/guest-stars/post/2014/03/12/html5-vs-native, Sep. 23, 2014, 5 pages.
Exhibit 2065—Rich Warren, Web Development for the iPhone, Why Web Development?, Jun. 2008, www.MACTECH.com., 8 pages.
Exhibit 2066—*Trans Video Electronics, Ltd.* v. *Sony Electronics, Inc.*, 822 F. Supp. 2d 1020 (N.D. Cal. 2011).
Exhibit 2067—Base—Definition and More from the Free Merriam-Webster Dictionary, Oct. 7, 2014, retrieved from the Internet: http://www.merriam-webster.com/dictionary/base, 8 pages.
Exhibit 2070—Simon XT User Guide, Mar. 2007.
U.S. Notice of Allowance for U.S. Appl. No. 13/735,193 dated Nov. 3, 2014, 27 pages.

\* cited by examiner

MONITORING SYSTEM CONTROL TECHNOLOGY USING MULTIPLE SENSORS, CAMERAS, LIGHTING DEVICES, AND A THERMOSTAT

CROSS-REFERENCE TO RELATED APPLICATIONS

The present application is a continuation of U.S. application Ser. No. 16/858,903, filed Apr. 27, 2020, which is a continuation of U.S. application Ser. No. 16/449,543, filed Jun. 24, 2019, which is a continuation of U.S. application Ser. No. 16/145,892, filed Sep. 28, 2018, which is a continuation of U.S. application Ser. No. 15/405,556, filed Jan. 13, 2017, which is a continuation of U.S. application Ser. No. 14/665,277, filed Mar. 23, 2015, which is a continuation of U.S. application Ser. No. 13/735,193, filed Jan. 7, 2013, which is a continuation of U.S. application Ser. No. 12/782,633, filed May 18, 2010, which claims the benefit of U.S. Provisional Application No. 61/179,215, filed May 18, 2009, each of which is incorporated herein by reference in its entirety for all purposes.

TECHNICAL FIELD

This disclosure relates to monitoring system control technology.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for monitoring system control technology.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for providing control of a monitoring system (e.g., a home alarm or security system) using one or more mobile devices. In some implementations, a native mobile device application enables use of a mobile device as a security/automation system keypad and controller for a home security system. In these implementations, the mobile device, using the native mobile device application, checks real time status of system and sensors, arms/disarms system, turns lights on/off, looks in on live video of security cameras, reviews history of system events, reviews saved video clips, monitors/changes thermostat settings, and performs other features of a traditional security keypad in a home security system.

Figure 1:
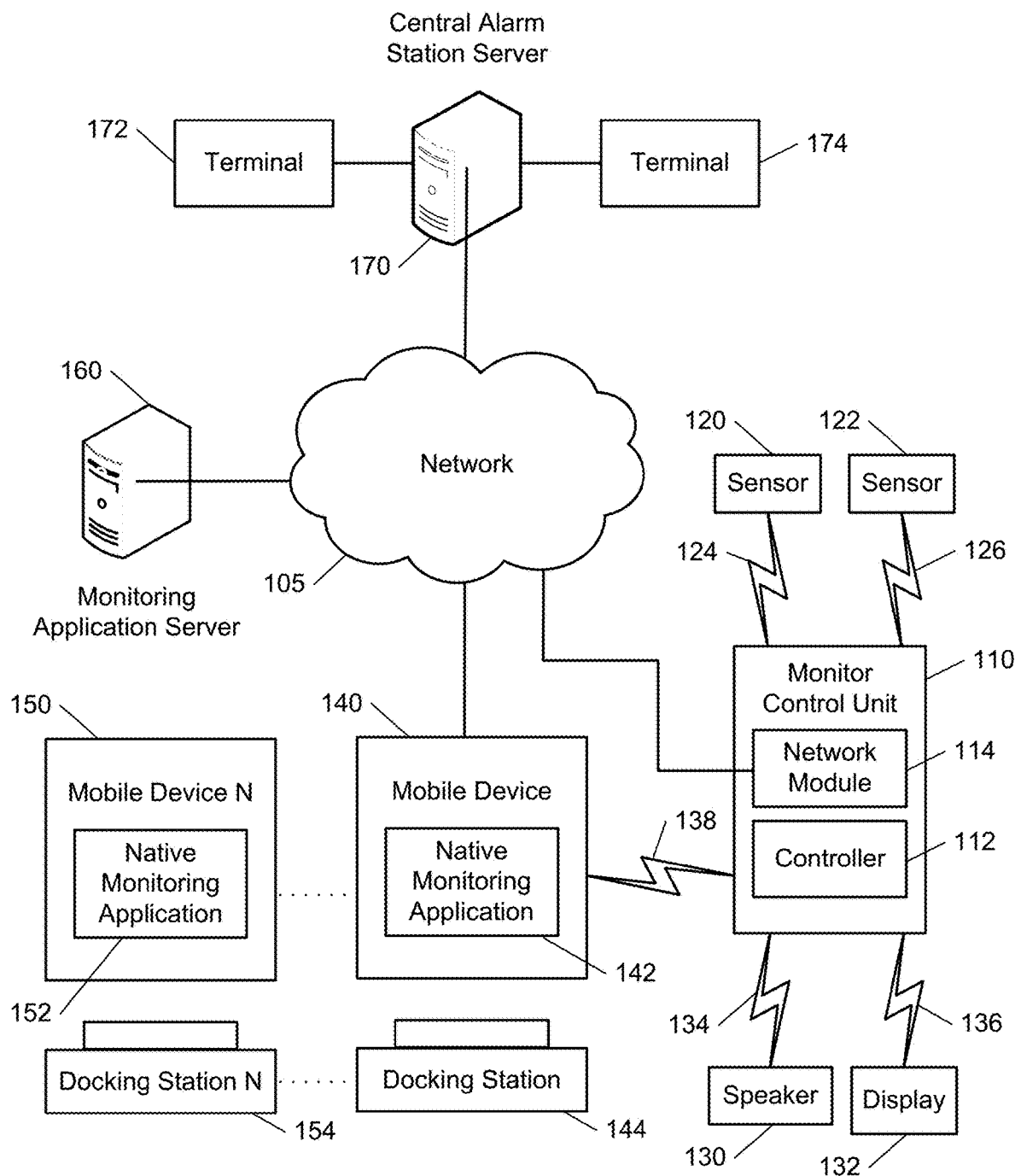
FIG. 1 is a block diagram of an example system.

FIG. 1 illustrates an example of an electronic system 100 configured to provide control of a monitoring system using one or more mobile devices. The electronic system 100 includes a network 105, a monitoring system control unit 110, one or more mobile devices 140, 150, a monitoring application server 160, and a central alarm station server 170. In some examples, the network 105 facilitates communications between the monitoring system control unit 110, the one or more mobile devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more mobile devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, an alarm system may include multiple sensors 120 and 122. The sensors 120 and 122 may include a contact sensor, a motion sensor, a glass break sensor, or any other type of sensor included in an alarm system or security system. The sensors 120 and 122 also may include an environmental sensor, such as a temperature sensor, a water sensor, a rain sensor, a wind sensor, a light sensor, a smoke detector, a carbon monoxide detector, an air quality sensor, etc. The sensors 120 and 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 and 122 may include a radio-frequency identification (RFID) sensor that identifies a particular article that includes a pre-assigned RFID tag. In addition, the sensors 120 and 122 may include a video/photographic camera or other type of optical sensing device configured to capture images and may include an energy consumption sensor for appliances and devices in a property monitored by the monitoring system.

The sensors 120 and 122 communicate with the controller 112 over communication links 124 and 126. The communication links 124 and 126 may be a wired or wireless data pathway configured to transmit signals from the sensors 120 and 122 to the controller 112. The sensors 120 and 122 may continuously transmit sensed values to the controller 112, periodically transmit sensed values to the controller 112, or transmit sensed values to the controller 112 in response to a change in a sensed value.

The controller 112 may receive signals from the sensors 120 and 122 and detect an alarm event based on the sensed values. For example, the sensor 120 may be a contact sensor provided on a door to a residence and the communication link 124 may be a wireless connection between the sensor 120 and the controller 112. In this example, the sensor 120 may sense that the door has been opened (e.g., absence of a connection between contacts included as part of the sensor) and wirelessly transmit data over communication link 124 to the controller 112 indicating that the door has been opened. The controller 112 receives the data from the sensor 120 over the communication link 124 and determines that an alarm event (e.g., the door opened) has occurred based on the signal from the sensor 120. The controller 112 controls operation of the alarm system based on the determination that the alarm event has occurred.

The monitoring system also includes a speaker 130. The speaker 130 may include an electromechanical transducer that converts an electrical signal into sound. The speaker 130 may receive an electrical signal from the controller 112 and produce an audible output based on the electrical signal. For example, the controller 112, in response to detecting an alarm event, may send a signal to the speaker 130 to cause the speaker to produce an audible alarm sound. The speaker 130 also may output audio messages (e.g., audio advertisements, broadcast audio alerts, etc.). In another example, the controller 112 may send a signal representative of a voice communication to the speaker 130 to cause the speaker to produce an audible output of the voice communication.

The monitoring system also includes a display 132. The display 132 may be any type of electronic display configured to render a visually perceivable display of information (e.g., an LCD display, a plasma display, a television, a computer monitor, a digital picture frame, a display integrated into an appliance, a display included in a portable device of a user, a mirror, a projection display device, etc.). The display 132 may be integrated in the monitoring system control unit 110 (e.g., control panel) or may be separate from the monitoring system control unit 110 (e.g., a separate display provided as part of the security system or a television, a computer monitor, etc. that is not part of the security system, but a device with which the security system may communicate). The display 132 may be used to depict the current state of the monitoring system. For example, an LCD display may display words like "System Disarmed 6:42 pm", or "Enter User Code to Disarm", or "Front Door Opened". The display 132 also may be used to display electronic content, such as advertisement content, news content, weather content, and entertainment content.

The monitoring system control unit 110 communicates with the speaker 130 and the display 132 over communication links 134 and 136. The communication links 134 and 136 may be similar to the communication links 124 and 126 described above.

The monitoring application server 160 is an electronic device configured to provide monitoring services by exchanging electronic communications with the monitoring system control unit 110, the one or more mobile devices 140, 150, and the central alarm station server 170 over the network 105. For example, the monitoring application server 160 may be configured to monitor alarm events generated by the monitoring system control unit 110. In this example, the monitoring application server 160 may exchange electronic communications with the network module 114 included in the monitoring system control unit 110 to receive information regarding alarm events detected by the monitoring system control unit 110. Additionally or alternatively, the monitoring application server 160 may receive information regarding alarm events from the one or more mobile devices 140, 150.

In some examples, the monitoring application server 160 may route alarm data received from the network module 114 or the one or more mobile devices 140, 150 to the central alarm station server 170. For example, the monitoring application server 160 may transmit the alarm data to the central alarm station server 170 over the network 105.

The monitoring application server 160 may store sensor data received from the monitoring system and perform analysis of sensor data received from the monitoring system. Based on the analysis, the monitoring application server 160 may communicate with and control aspects of the monitoring system control unit 110 or the one or more mobile devices 140, 150.

The central alarm station server 170 is an electronic device configured to provide alarm monitoring service by exchanging communications with the monitoring system control unit 110, the one or more mobile devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For example, in the example described above, the controller 112 may control the network module 114 to transmit, to the central alarm station server 170, alarm data indicating that the sensor 120 detected the door opening. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 1 illustrates two terminals for brevity, actual implementations may include more (and, perhaps, many more) terminals.

The one or more mobile devices 140, 150 are devices that host and display user interfaces and that host one or more native applications (e.g., the native monitoring application 142, 152). The one or more mobile devices 140, 150 may be cellular phones or non-cellular locally networked devices with displays. The one or more mobile devices 140, 150 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The one or more mobile devices 140, 150 may be the same or may include mobile devices of different types. The one or more mobile devices 140, 150 may perform functions unrelated to the monitoring system, such as placing personal telephone calls, playing music, playing video, displaying pictures, browsing the Internet, maintaining an electronic calendar, etc.

The one or more mobile devices 140, 150 communicate with and receive monitoring system data from the monitoring system control unit 110 using the communication link 138. For instance, the one or more mobile devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more mobile devices 140, 150 to local security and automation equipment. The one or more mobile devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more mobile devices 140, 150 are shown as communicating with the monitoring system control unit 110, the one or more mobile devices 140, 150 may communicate directly with the sensors and other devices controlled by the monitoring system control unit 110. In some implementations, the one or more mobile devices 140, 150 replace the monitoring system control unit 110 (e.g., the main security/automation control panel) and perform the functions of the monitoring system control unit 110 for local monitoring and long range/offsite communication.

In other implementations, the one or more mobile devices 140, 150 receive monitoring system data captured by the monitoring system control unit 110 through the network 105. The one or more mobile devices 140, 150 may receive the data from the monitoring system control unit 110 through the network 105 or the monitoring application server 160 may relay data received from the monitoring system control unit 110 to the one or more mobile devices 140, 150 through the network 105. In this regard, the monitoring application server 160 may facilitate communication between the one or more mobile devices 140, 150 and the monitoring system.

Although the one or more mobile devices 140, 150 are shown as being connected to the network 105, in some implementations, the one or more mobile devices 140, 150 are not connected to the network 105. In these implementations, the one or more mobile devices 140, 150 communicate directly with one or more of the monitoring system components and no network (e.g., Internet) connection or reliance on remote servers is needed.

The one or more mobile devices 140, 150 each include a native monitoring application 142, 152, respectively. The native monitoring application 142, 152 refers to a software/firmware program running on the corresponding mobile device that enables the user interface and features describe below. The one or more mobile devices 140, 150 may load or install the native monitoring application 142, 152 based on data received over a network or data received from local media. The native monitoring application 142, 152 runs on mobile devices platforms, such as iPhone, iPod touch, Blackberry, Google Android, Windows Mobile, etc.

The native monitoring application 142, 152 provides an alternative to proprietary, expensive, inflexible and/or difficult to use security/automation system keypads and controllers. The native monitoring application 142, 152 enables use of the one or more mobiles devices 140, 150 as security/automation system keypads and controllers for the monitoring system by generating and displaying graphical user interfaces on the one or more mobiles devices 140, 150 that display status of the monitoring system and enable user control of the monitoring system. Because the one or more mobiles devices 140, 150 are portable, the native monitoring application 142, 152 allows users to carry a security/automation system keypad around the house, wall-mount it, table-mount it on a bedstand or coffee table; waterproof-mount it in a shower/bath, and otherwise use the security/automation system keypad anywhere the user chooses.

The native monitoring application 142, 152 may be used to check real time status of system and sensors. For instance, the native monitoring application 142, 152 may display status information in response to user input.

The native monitoring application 142, 152 also may provide alerts based on monitoring system data. For example, the native monitoring application 142, 152 may cause the mobile device to produce an audible alert and/or vibrate when the monitoring system detects a door or window being opened.

The native monitoring application 142, 152 may be used to arm/disarm system. For example, the native monitoring application 142, 152 enables a user to provide a passcode to the mobile device 140, 150 and thereby arm/disarm the system from any room of the house, from close by areas, and, in some examples, from remote locations. The native monitoring application 142, 152 further may be used to turn lights on/off and view and change thermostat settings by displaying controls with which a user may interact to control devices connected to the monitoring system.

In some implementations, the native monitoring application 142, 152 may be used to view live video on the mobile device 140, 150. For instance, the native monitoring application 142, 152 may show footage recorded by a front door camera from an upstairs bedroom, display video of infant crib when in a master bedroom down the hall, and display video of children in a playroom while working in a home office. The native monitoring application 142, 152 may be used to review a history of system events, review saved video clips, and provide other standard features of a traditional security keypad. Because the native monitoring application 142, 152 is installed on a mobile device of a user's selection, the native monitoring application 142, 152 may provide enhanced convenience and enable a user to more easily interact and leverage the user's monitoring system.

In some examples, the native monitoring application 142, 152 may leverage other features of the one or more mobile devices 140, 150 in providing monitoring services. For example, when a mobile device is able to communicate over the network 105, the native monitoring application 142, 152 may send communications to the monitoring application server 160 and/or the central alarm station server 170 in response to an alarm event (e.g., a security breach). In this example, the native monitoring application 142, 152 may control the mobile device to send alarm data over an Internet connection included in the mobile device and/or may control the mobile device to place a cellular telephone call to the central alarm station server 170 to establish a two-way voice communication. In other examples, the native monitoring application 142, 152 may leverage a contact list or electronic calendar application of the mobile device to provide alerts related to monitoring system events. In further examples, when the mobile device includes a camera, the native monitoring application 142, 152 may transmit images captured by the camera during a security breach (e.g., images of an intruder) to the monitoring system, the monitoring application server 160 and/or the central alarm station server 170.

In some implementations, the native monitoring application 142, 152 may include security features to assist in situations when a mobile device is not functioning or becomes compromised. For instance, the native monitoring application 142, 152 may periodically communicate its state to the monitoring application server 160 or the monitoring system control unit 110. Accordingly, when a mobile device malfunctions (e.g., runs out of battery, is broken, etc.), the monitoring application server 160 or the monitoring system control unit 110 is able to detect the malfunction and provide output (an electronic message, an audible and/or visual alert, etc.) alerting a user of the malfunction.

The native monitoring application 142, 152 also may implement a permission system that provides a different level of control for different users. For instance, parent users may have full control of the monitoring system and a child user may have limited control (e.g., the child user may be able to arm/disarm the system, but may not be able to modify alerts provided in response to alarm events.) The permission system may be implemented based on user-specific passcodes or particular mobile devices may be assigned to particular users.

In implementations in which multiple mobile devices are included in the system 100, the native monitoring application 142, 152 may include rules that govern input from which of the multiple devices controls when conflicting input is received. For instance, when a parent user is attempting to perform a first action and a child user is attempting to perform a second, different action that conflicts with the first action, the rules of the native monitoring application 142, 152 (or monitoring system in general) may perform only the first action because the parent user has higher priority than the child user.

The one or more mobile devices 140, 150 may be associated with one or more docking stations 144,154. The number of mobile devices may equal the number of docking stations or the number of mobile devices may different (more or fewer) than the number of docking stations. The one or more docking stations 144,154 may provide a power connection for charging of a battery of the one or more mobile devices 140, 150. The one or more docking stations 144,154 also may provide a convenient, known location in a home to store the one or more mobile devices 140, 150 and further may provide enhanced communication features for the one or more mobile devices 140, 150 when docked (e.g., the one or more docking stations 144,154 may provide the one or more mobile devices 140, 150 with a connection to the network 105 when the one or more mobile devices 140, 150 otherwise cannot connect to the network).

In some implementations, the one or more docking stations 144,154 may track certain characteristics of the one or more mobile devices 140, 150 and provide alerts based on the tracking. For instance, the one or more docking stations 144,154 may track times when the one or more mobile devices 140, 150 are docked and, therefore, charging. When the one or more docking stations 144,154 detect that a particular mobile device has not been connected to a docking station for a threshold period of time (e.g., a time that correspond to battery life of the particular mobile device), the one or more docking stations 144,154 may provide output (an electronic message, an audible and/or visual alert, etc.) alerting a user or the monitoring application server 160 that the particular mobile device needs to be charged. The user or the monitoring application server 160 may take appropriate action in response to the output.

In addition, the one or more docking stations 144,154 may track a location of the one or more mobile devices 140, 150. When the one or more docking stations 144,154 detect that a particular mobile device has moved to more than a threshold distance from a home being monitored by the monitoring system (e.g., more than a one hundred yards from the home), the one or more docking stations 144,154 may provide output (an electronic message, an audible and/or visual alert, etc.) alerting a user or the monitoring application server 160 that the particular mobile device is outside of a preferred range. The user or the monitoring application server 160 may take appropriate action in response to the output.

In some implementations, the one or more mobile devices 140, 150 are used in conjunction with local sensors in a house as an "awareness system." The awareness system is different than a "security system" in that the awareness system is not able contact a central station to call the fire department or the police in response to an alarm event. In the "awareness system" implementation, the system 100 only includes the one or more mobile devices 140, 150 and the sensors 120, 122. The one or more mobile devices 140, 150 receive sensor data directly from the sensors and provide the appropriate interfaces/processing to generate alarm events, modify settings, etc.

In another "awareness system" implementation, the system 100 further includes network 105 and the sensors 120, 122 are configured to communicate sensor data to the one or more mobile devices 140, 150 over network 105 (e.g., the Internet, cellular network, etc.). In yet another implementation, the sensors 120, 122 (or a component, such as a bridge/router) are intelligent enough to change the communication pathway from a direct local pathway when the one or more mobile devices 140, 150 are in close physical proximity to the sensors 120, 122 to a pathway over network 105 when the one or more mobile devices 140, 150 are farther from the sensors 120, 122. In some examples, the system leverages GPS information from the one or more mobile devices 140, 150 to determine whether the one or more mobile devices 140, 150 are close enough to the sensors 120, 122 to use the direct local pathway or whether the one or more mobile devices 140, 150 are far enough from the sensors 120, 122 that the pathway over network 105 is required. In other examples, the system leverages status communications (e.g., pinging) between the one or more mobile devices 140, 150 and the sensors 120, 122 to determine whether communication using the direct local pathway is possible. If communication using the direct local pathway is possible, the one or more mobile devices 140, 150 communicate with the sensors 120, 122 using the direct local pathway. If communication using the direct local pathway is not possible, the one or more mobile devices 140, 150 communicate with the sensors 120, 122 using the pathway over network 105.

FIGS. 2, 4, 6, and 9 illustrate example processes. The operations of the example processes are described generally as being performed by the system 100. The operations of the example processes may be performed by one of the components of the system 100 (e.g., the monitoring application server 160) or may be performed by any combination of the components of the system 100. In some implementations, operations of the example processes may be performed by one or more processors included in one or more electronic devices.

Figure 2:
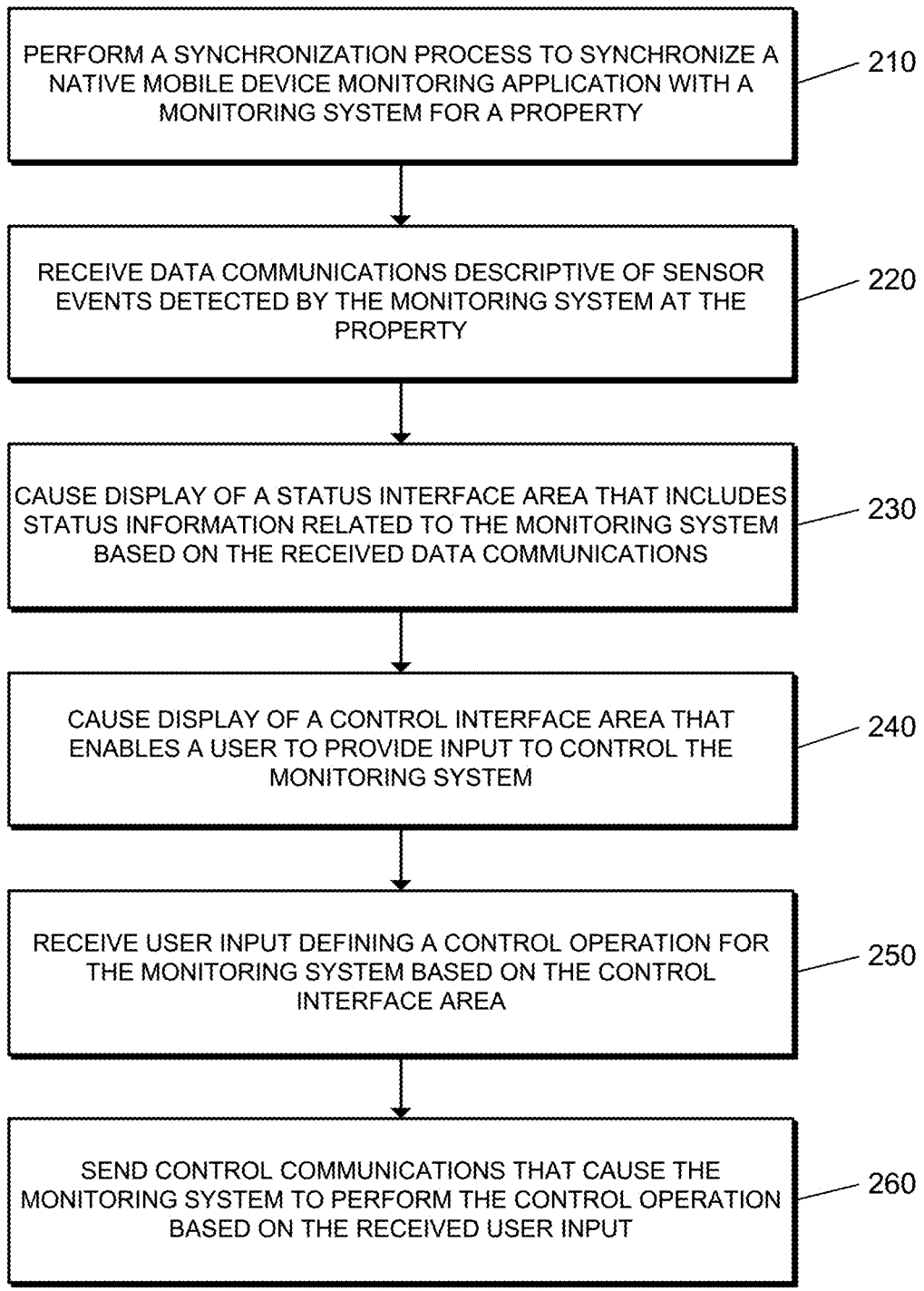
FIGS. 2, 4, 6, and 9 are flow charts illustrating example processes.

FIG. 2 illustrates an example process 200 for using a native mobile device monitoring application to control a monitoring system. The system 100 performs a synchronization process to synchronize a native mobile device monitoring application with a monitoring system for a property (210). For instance, after the native mobile device monitoring application is loaded (e.g., downloaded) to a mobile device, the system 100 synchronizes the native mobile device monitoring application with a monitoring system for a property. The synchronization allows the native mobile device monitoring application to receive events detected by sensors in the appropriate monitoring system and send control commands to control operations related to the appropriate monitoring system.

In some examples, the monitoring system may include one or more local components at the property that are configured to communicate directly with the native mobile device monitoring application. In these examples, the one or more local components may include a control panel (e.g., a security system control panel) that is configured to communicate directly with the native mobile device monitoring application and/or sensors that are configured to communicate directly with the native mobile device monitoring application. The native mobile device monitoring application may communicate directly with the one or more local monitoring system components at the property using a short range wireless communication protocol, such as Bluetooth, Z-Wave, ZigBee, Wi-Fi, etc.

In examples in which the native mobile device monitoring application communicates directly with one or more local monitoring system components at the property, the system 100 may synchronize, over a short range wireless communication protocol, with the one or more local components of the monitoring system located at the property. The synchronization may include a registration or pairing process, which enables the mobile device operating the native mobile device monitoring application to exchange data communications descriptive of sensor events detected by the monitoring system at the property directly with the one or more local components of the monitoring system located at the property over the short range wireless communication protocol. For instance, the mobile device operating the native mobile device monitoring application may receive sensor data directly from sensors located at the property or may receive sensor data directly from a control panel that is located at the property and that receives sensor data directly from sensors located at the property.

In some implementations, the monitoring system may include a monitoring application server that is located remote from the property and that is configured to receive, over a network, data communications descriptive of sensor events detected by the one or more sensors included in the monitoring system. In these implementations, the monitoring application server provides enhanced monitoring and notification services for the local monitoring system, and may service many different local monitoring systems (e.g., many different local security systems that each monitors a property). The native mobile device monitoring application may communicate with the monitoring application server over a network.

In implementations in which the native mobile device monitoring application communicates with a remote monitoring application server over a network, the synchronization process may involve the native mobile device monitoring application coordinating with the monitoring application server to synchronize with the monitoring system. For instance, the native mobile device monitoring application may send authentication information (e.g., inputted username and password) to the monitoring application server to authenticate the native mobile device monitoring application to the monitoring application server. Once authenticated, the monitoring application server may handle the synchronization process, which enables the native mobile device monitoring application to receive sensor event data detected by the monitoring system and send control commands to cause control of the monitoring system.

In some examples, the monitoring application server may coordinate the synchronization process by sending communication information (e.g., protocol and/or permission information) to the native mobile device monitoring application and/or one or more local components of the monitoring system at the property. In these examples, the communication information may enable direct communication between the native mobile device monitoring application and the one or more local components of the monitoring system at the property. For instance, the monitoring application server may provide the native mobile device monitoring application with a pass code for the one or more local monitoring system components associated with the user authenticated to the monitoring application server. The native mobile device monitoring application may use the pass code to enable direct communication with the one or more local monitoring system components over a short range wireless communication protocol.

In some implementations, the monitoring application server may coordinate the synchronization process by synchronizing, over a network, with the native mobile device monitoring application. In these implementations, the mobile device operating the native mobile device monitoring application exchanges, with the monitoring application server over the network, data communications descriptive of sensor events detected by the monitoring system at the property. For instance, when a sensor detects an event at the property, the detected event is sent first to the monitoring application server. Then, the monitoring application server identifies the native mobile device monitoring application as being synchronized with the monitoring system that detected the event and, based on the identification, forwards information describing the detected sensor event to the native mobile device monitoring application. The monitoring application server also may receive control commands from the native mobile device monitoring application and relay the control commands to the local monitoring system synchronized with the native mobile device monitoring application.

In some examples, the native mobile device monitoring application may synchronize with both a remote monitoring application server and one or more local monitoring system components at a property. In these examples, the native mobile device monitoring application may communicate directly with the one or more local monitoring system components when the mobile device operating the native mobile device monitoring application is located relatively close to the one or more local monitoring system components (e.g., within the property). The native mobile device monitoring application may communicate indirectly with the one or more local monitoring system components through the monitoring application server when the mobile device operating the native mobile device monitoring application is located relatively far from the one or more local monitoring system components (e.g., outside the property more than a threshold distance away).

The system 100 receives one or more data communications descriptive of sensor events detected by the monitoring system at the property (220). For example, depending on the synchronization process, the native mobile device monitoring application receives the data communications descriptive of sensor events directly from sensors located at the property, directly from a control panel located at the property, or from a remote monitoring application server that receives data communications from a local monitoring system component located at the property and relays sensor event data to the native mobile device monitoring application.

The received one or more data communications descriptive of sensor events may indicate that the monitoring system has detected a potential alarm event at the property. The received one or more data communications descriptive of sensor events also may indicate a status of an appliance, a potential notification event, or any type of attribute that the monitoring system is able to sense.

The system 100 causes display of a status interface area that includes status information related to the monitoring system based on the received data communications (230). For instance, the system 100 may display a status of one or more sensed attributes or may display an alert related to a detected alarm event or notification event. The status interface area may display information indicating whether a security system is armed or disarmed, whether doors and/or windows at the property are open or closed, and whether motion has been detected within the property. The status interface area also may display a status of a device or appliance at the property (e.g., a thermostat setting and a temperature measurement) or image data (e.g., live video) captured by an image sensor located at the property.

In some examples, the system 100 may automatically, without human intervention, interrupt another application (e.g., a media application) operating on the mobile device at a time of receipt of the one or more data communications to display status information. The interrupted application may be separate from the native mobile device monitoring application and unrelated to the monitoring system. In these examples, after interrupting the application, the system 100 may automatically, without human intervention, cause display of status information (e.g., a detected alarm event or notification event) detected by the monitoring system at the property. For instance, the system 100 may interrupt another application and display an alert that includes a description of a potential alarm event at the property detected by the monitoring system. The alert (or other displayed status information) may replace at least a portion of a display (e.g., media content) being output by the interrupted application at a time of receipt of the one or more data communications. The system 100 may automatically, without human intervention, resume the interrupted application after the alert has been handled.

The system 100 causes display of a control interface area that enables a user to provide input to control the monitoring system (240). For instance, the system 100 may display one or more input buttons that allow a user to provide input to control functionality of the monitoring system. The control interface area may display controls that enable a user to arm or disarm a security system at a property, change notification settings for sensor events, change a thermostat setting at the property, control a lighting device at the property, or perform any other control operation that may be performed with respect to the monitoring system. The control interface area may be displayed when the native mobile device monitoring application initiates or may be displayed in response to user input provided to the native mobile device monitoring application. The control interface area also may be displayed concurrently with or after display of the status information displayed by the native mobile device monitoring application. For instance, the control interface area may be displayed concurrently with an alert that indicates a potential alarm event and that includes an input control that corresponds to an alarm control operation that causes the monitoring system to perform an operation related to the potential alarm event (e.g., arm a security system or trigger an alarm event).

The system 100 receives user input defining a control operation for the monitoring system based on the control interface area (250). For example, the system 100 receives user input interacting with any of the controls displayed in the control interface area. In this example, the received user input may indicate a desire to arm or disarm a security system at a property, change notification settings for sensor events, change a thermostat setting at the property, control a lighting device at the property, or perform any other control operation that may be performed with respect to the monitoring system. The system 100 may receive user input activating an input control displayed by the native mobile device monitoring application.

The system 100 sends one or more control communications that cause the monitoring system to perform the control operation based on the received user input (260). For example, depending on the synchronization process, the native mobile device monitoring application sends the control communications directly to a local monitoring system component located at the property (e.g., directly to a control panel, sensor, or thermostat at the property), or to a remote monitoring application server that relays the control communications to a local monitoring system component located at the property.

The sent one or more control communications may cause the system 100 to arm or disarm a security system at a property, change notification settings for sensor events, change a thermostat setting at the property, control a lighting device at the property, or perform any other control operation that may be performed with respect to the monitoring system. For instance, the native mobile device monitoring application may send one or more control communications that cause the monitoring system to perform an alarm control operation defined by user input received after interrupting another application and displaying a potential alarm event. In this example, the system 100 may automatically, without human intervention, resume, on the mobile device, operation of the interrupted application after receiving user input activating an input control that corresponds to the alarm control operation.

Figure 3:
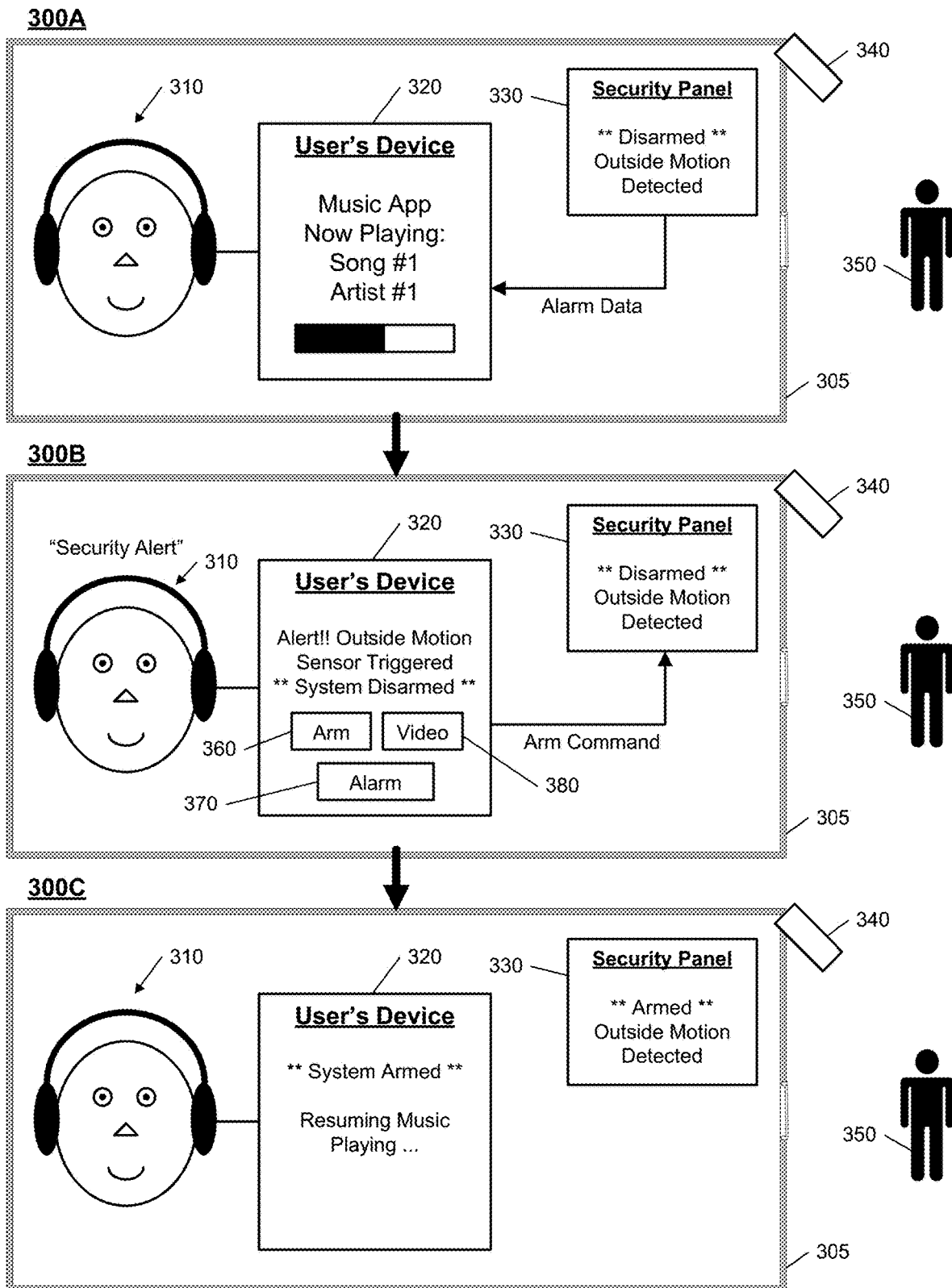
FIG. 3 illustrates an example of using a native mobile device monitoring application to control a monitoring system.

FIG. 3 illustrates an example of using a native mobile device monitoring application to control a monitoring system. As shown, a property 305 is monitored by a monitoring system (e.g., a security system) that includes a security control panel 330 and a motion sensor 340 that senses motion of an area outside a front door of the property 305. The security control panel 330 may display status information for the monitoring system and may include one or more input controls that enable control of the monitoring system. The motion sensor 340 may be an image sensor that detects motion by capturing a series of images of the area outside the front door of the property 305 and analyzing the series of images for differences. The monitoring system has been described as including only the security control panel 330 and the motion sensor 340 for brevity, but may include many more sensors and features.

In this example, a user 310 is located within the property 305 and is using a mobile device 320. The mobile device 320 may be a potable music device or a smart phone. The user 310 has controlled the mobile device 320 to load a native mobile device monitoring application and has synchronized the native mobile device monitoring application with the monitoring system of the property 305. Based on the synchronization, the mobile device 320 is able to use the native mobile device monitoring application to exchange communications with the security control panel 330 over a short range wireless communication protocol.

At a first time 300A in the example shown in FIG. 3, the user 310 is using the mobile device 320 to operate a music application that outputs music through headphones being worn by the user 310. While the mobile device 320 is operating the music application and the user 310 is listening to music, the motion sensor 340 detects motion of a potential intruder 350 within the area outside the front door of the property 305. Based on the detected motion, the motion sensor 340 sends a signal to the security control panel 330 and the security control panel 330 determines that the motion sensor 340 has been triggered based on the signal. The security control panel 330 also determines that the monitoring system is presently in a disarmed state in which alarm events are not sent to a central monitoring station for processing.

Based on the determination that the motion sensor 340 has been triggered and the determination that the monitoring system is presently in the disarmed state, the security control panel 330 sends alarm data to the mobile device 320 over the short range wireless communication protocol. The alarm data indicates that a potential alarm event has been detected and includes details related to the potential alarm event. In this example, the details indicate that the motion sensor 340 has been triggered at a time when the monitoring system is in the disarmed state.

The mobile device 320 receives the alarm data while operating the music application. In the background while the music application continues to operate and output music, the native mobile device monitoring application processes the alarm data to determine whether any action is needed based on the alarm data. In this example, based on the processing of the alarm data, the native mobile device monitoring application determines that the music application should be interrupted and that an alert describing the potential alarm event should be provided to the user 310 using the mobile device 320.

At a second time 300B in the example shown in FIG. 3, the native mobile device monitoring application implements the action determined based on processing of the alarm data. Specifically, the native mobile device monitoring application causes the music application to be interrupted, which at least temporarily stops it from outputting music. The music application may be paused at the time of interruption and moved to a background process that may be resumed at a later time. The native mobile device monitoring application also outputs an audible alert through the headphones and displays a visual alert to indicate the potential alarm event to the user 310. The audible alert may be a voice command that indicates a security alert has been detected and directs attention of the user 310 to the display of the mobile device 310 to gain more information about the security alert. The visual alert displays an indication that a potential alarm event has been detected and indicates that the motion sensor 340 has been triggered and that the monitoring system is in the disarmed state.

In this example, the native mobile device monitoring application also displays input controls concurrently with the alert to enable the user 310 to take action or gain more information about the alert. In particular, the native mobile device monitoring application displays an arm input control 360, an alarm input control 370, and a video input control 380.

The arm input control 360 allows the user 310 to provide a touch input at the arm input control 360 to cause the monitoring system to change to an armed state. In the armed state, the monitoring system sends detected alarm events to a central monitoring station for processing.

The alarm input control 370 allows the user 310 to provide a touch input at the alarm input control 370 to cause the monitoring system to generate an alarm event and send the alarm event to a central monitoring station. The alarm input control 370 is similar to a panic button, which the user 310 activates when the user 310 believes an alarm situation is occurring and would like emergency services to be contacted immediately.

The video input control 380 allows the user 310 to provide a touch input at the video input control 380 to cause the monitoring system to send image (e.g., video) data captured by the motion sensor 340 to the mobile device 320. The mobile device 320 then displays the image (e.g., video) data captured by the motion sensor 340 so that the user 310 can view the area outside the front door of the property 305 and assess the situation.

Although three input controls are shown in this example, many different types of input controls may be displayed to assist the user 310 in handling and assessing the potential alarm event. Also, the native mobile device monitoring application may display a cancel input control that allows the user 310 to take no action in response to the potential alarm event and return to the prior application operating on the mobile device 320.

In the example shown in FIG. 3, the user 310 activates the arm input control 360 based on the potential alarm event. In response to activation of the arm input control 360, the native mobile device monitoring application causes the mobile device 320 to send an arm command to the security control panel 330 over the short range wireless communication protocol.

At a third time 300C in the example shown in FIG. 3, the security control panel 330 receives the arm command from the mobile device 320 over the short range wireless communication protocol and, in response to the arm command, arms the monitoring system to change the monitoring system from the disarmed state to the armed state. The native mobile device monitoring application causes the mobile device 320 to display an indication that the monitoring system has been armed and that the mobile device 320 is resuming the interrupted music application. The native mobile device monitoring application may cause the mobile device 320 to display the indication that the monitoring system has been armed immediately after sending the arm command or may wait for a confirmation signal from the security control panel 330 before displaying the indication that the monitoring system has been armed.

In addition, because the potential alarm event has been handled by the user 310, the mobile device 320 resumes the music application and begins playing music from the point in which the music application was paused. The native mobile device monitoring application is moved to a background process that monitors for receipt of potential alarm data. By alerting the user 310 to the potential alarm event and allowing the user 310 to easily take action in response to the potential alarm event, the native mobile device monitoring application may provide the user 310 with an enhanced security experience that provides the user 310 with increased protection against intrusions.

Figure 4:
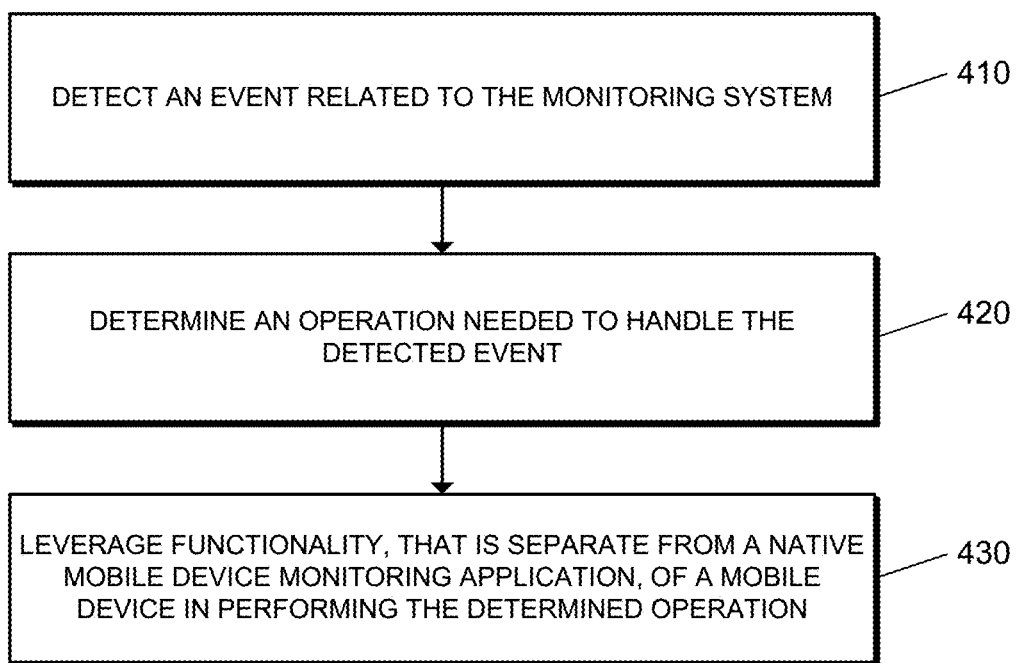

FIG. 4 illustrates an example process 400 for leveraging functionality of a mobile device in performing an operation related to a detected event. The system 100 detects an event related to the monitoring system (410). For instance, the system 100 may detect an alarm condition (e.g., a security breach) at a property. The system 100 also may detect a notification event that triggers consideration of whether a notification should be sent based on attributes sensed at the property. The system 100 further may detect requests to control the monitoring system as events. The system 100 may detect single events (e.g., a single contact sensor trigger) or detect a series or pattern of events (e.g., a pattern of contact sensor triggers, a motion sensor trigger, and an RFID tag identification).

The system 100 determines an operation needed to handle the detected event (420). The system 100 may determine several different, types of operations for handling detected events. For example, when the system 100 detects an alarm condition, the system 100 may determine that a central monitoring station should be contacted and that one or more notification recipients should be contacted. In another example, when the system 100 detects a notification event, the system 100 may identify one or more recipients for the notification and determine that a notification should be sent to the identified one or more recipients. In a further example, when the system 100 detects a request to control the monitoring system, the system 100 may determine whether one or more control operations should be performed based on the request to control the monitoring system. The determined operation may leverage functionality of the mobile device that is separate from and different than the native mobile device monitoring application in performing the determined operation. By leveraging functionality of the mobile device that is separate from and different than the native mobile device monitoring application, the system 100 may provide a monitoring system control tool that has increased functionality and opportunities as compared to traditional security system keypads that have limited functionality and are secured to a wall of the property.

The system 100 leverages functionality, that is separate from a native mobile device monitoring application, of a mobile device in performing the determined operation (430). For instance, the native mobile device monitoring application may use any feature or functional component of the mobile device that may be useful in performing the determined operation and handling the detected event.

In some examples, the system 100 may automatically, without user intervention, use a cellular network communication module of the mobile device to transmit data to a monitoring application server or a central alarm station server that dispatches emergency services in response to alarm events. In these examples, the cellular network communication module of the mobile device may be the primary pathway for data to the monitoring application server or the central alarm station server or may be used as a backup pathway when a primary pathway fails. The data transmitted by the cellular network communication module of the mobile device may be alarm data that indicates an alarm event detected by a monitoring system. The data transmitted by the cellular network communication module of the mobile device also may be two-way voice communication data that enables an operator associated with the central alarm station server to communicate with a user associated with the monitoring system through the mobile device.

In some implementations, the system 100 may automatically, without user intervention, use an address book application, that is maintained separate from the native mobile device monitoring application, of the mobile device to identify contact information for a recipient of a notification to be sent in response to detecting the event related to the monitoring system. In these implementations, the system 100 may use the address book application to select a recipient of a notification or to identify contact information for a selected recipient. In selecting a recipient of a notification, the system 100 may analyze attributes (e.g., address, relationship, etc.) stored for contacts in the address book application and select a contact that has appropriate attributes for the notification.

In some examples, the system 100 may automatically, without user intervention, use a calendar application, that is maintained separate from the native mobile device monitoring application, of the mobile device to identify schedule information for a user associated with the mobile device. In these examples, the system 100 may use the identified schedule information to inform operations performed by the native mobile device monitoring application. For instance, the system 100 may determine, based on the calendar application, that the user associated with the mobile device is presently in a meeting and unable to assist with a potential alarm event. Based on this determination, the system 100 may attempt to notify another person of the potential alarm event who will be able to assist with the potential alarm event more quickly than the user associated with the mobile device. The system 100 also may provide details of the schedule information to other notification recipients, including emergency services personnel.

In addition, the system 100 may automatically, without user intervention, use a network browser application of the mobile device to retrieve information related to the detected event, and present, using the mobile device, the information retrieved by the network browser application. For example, when the detected event is a part malfunction in the monitoring system, the system 100 may automatically use the network browser application to load and display a website of the monitoring company that relates to the part detected as malfunctioning. In this example, the website may display information of how the part can be fixed, options for purchasing a replacement of the part, and/or information to contact the monitoring company for help in fixing or replacing the part. When the detected event is a home intrusion, the system 100 may automatically use the network browser application to load and display a website of a police department that includes details for properly reporting the home intrusion to the police.

In some implementations, the system 100 may automatically, without user intervention, use a messaging application of the mobile device to send a notification in response to detecting the event related to the monitoring system. In these implementations, the system 100 may use a short message service (SMS) module to send an SMS message to a notification recipient. The system 100 also may use an electronic mail application to send an electronic mail message to a notification recipient.

Further, the system 100 may automatically, without user intervention, use a speaker of the mobile device to provide an audible alert related to the detected event. The system 100 also may use a camera of the mobile device to capture one or more images and associate the one or more images captured by the camera with the detected event. For instance, when a home invasion is detected, the system 100 may control the camera of the mobile device to capture images and then immediately transfer the captured images offsite as additional information to use in identifying an intruder. This may be particularly helpful when a user is present at the time of the intrusion and able to point the camera of the mobile device at the intruder.

Figure 5:
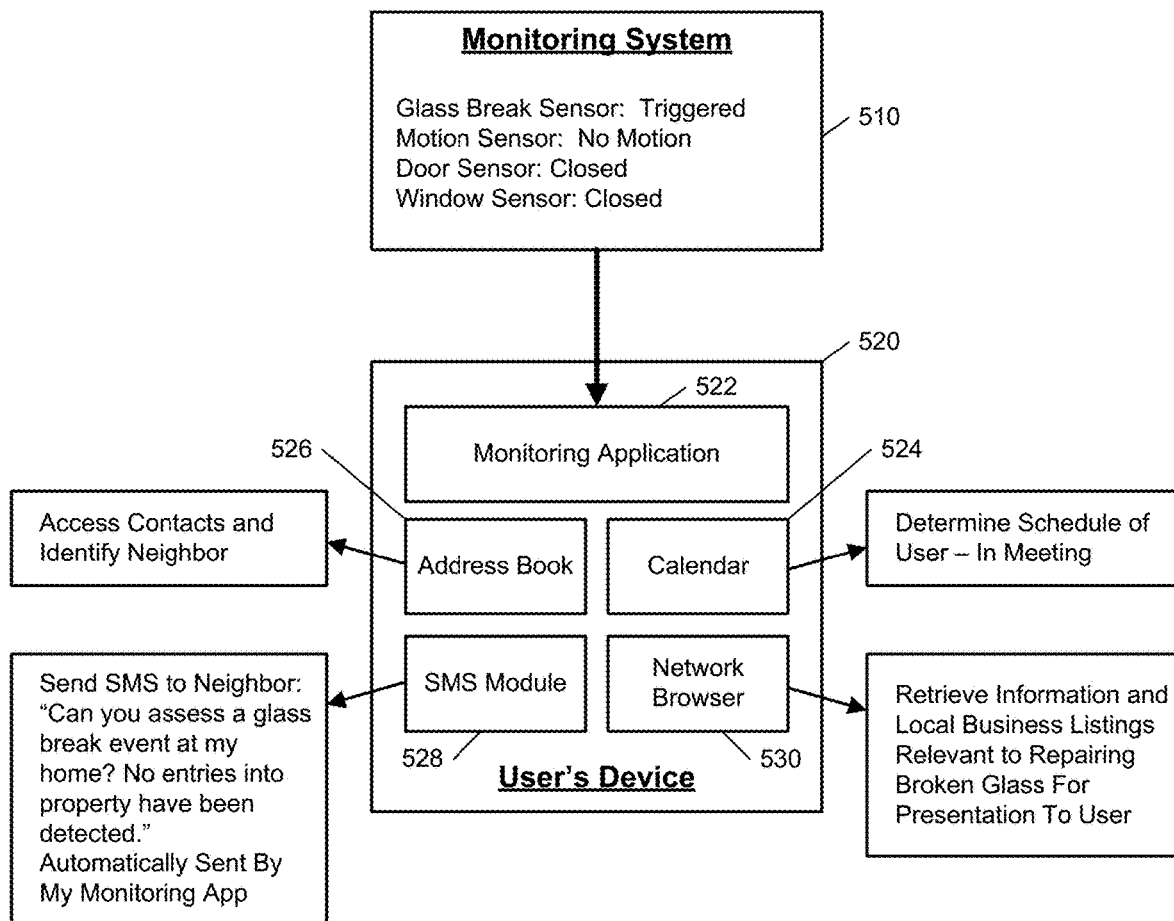
FIG. 5 illustrates an example of leveraging functionality of a mobile device in performing an operation related to a detected event.

FIG. 5 illustrates an example of leveraging functionality of a mobile device in performing an operation related to a detected event. As shown, a monitoring system 510 that monitors a property detects that a glass break sensor has been triggered at the property. The glass break sensor suggests that a glass window or door at the property has been broken. The monitoring system 510 also determines that a motion sensor has not detected any motion within the property, that a window sensor detects the corresponding window as being closed, and that a door sensor detects the corresponding door as being closed.

The monitoring system 510 sends the detected sensor data (e.g., data from each of the glass break sensor, the motion sensor, the window sensor, and the door sensor) to a native monitoring application 522 running on a mobile device 520. The native monitoring application 522 processes the received sensor data to determine whether any actions need to be taken. In this regard, the native monitoring application 522 determines that a glass break event has occurred, but that it is unlikely associated with an intrusion because the motion sensor has not detected any motion within the property, the window sensor detects the corresponding window as being closed, and the door sensor detects the corresponding door as being closed. Accordingly, the native monitoring application 522 determines that the glass break event was likely an accidental glass break event (e.g., a neighborhood child accidentally throwing a baseball through a glass window at the property) and handles the glass break event accordingly.

In handling the accidental glass break event, the native monitoring application 522 leverages several features of the mobile device 520 that are separate from the native monitoring application 522. First, the native monitoring application 522 uses a calendar application 524 on the mobile device 520 to determine schedule information for the user associated with the mobile device 520. In this example, the calendar application 524 reveals that the user is currently in a meeting and unable to assess the glass break event for some time.

In response to the determination that the user is currently in a meeting and unable to assess the glass break event for some time, the native monitoring application 522 uses an address book application 526 on the mobile device 520 to determine a possible notification recipient that may be able to assist the user in handling the glass break event. In this example, the native monitoring application 522 accesses contact information from the address book application 526, identifies contacts in the address book labeled as friends, and compares address information for the identified contacts to the address of the property to determine whether any of the friends live close to the property. Based on the comparison, the native monitoring application 522 identifies one or more neighbors of the user, selects the one or more neighbors as one or more notification recipients, and accesses, from the address book application 526, contact information (e.g., mobile telephone number) for the one or more neighbors.

After identifying the one or more neighbors as one or more notification recipients, the native monitoring application 522 uses the accessed contact information (e.g., mobile telephone number) to send a notification to each of the one or more notification recipients. In this example, the native monitoring application 522 leverages an SMS module 528 of the mobile device 520 to send an SMS notification to each of the one or more notification recipients. The SMS notification asks the recipient if the recipient can assess a glass break event at the user's property, indicates that no entries into the property have been detected, and indicates that the SMS notification was automatically sent by the native monitoring application 522.

In addition, the native monitoring application 522 uses a network browser 530 on the mobile device 520 to retrieve information that may be useful to the user associated with the mobile device 520 in handling the glass break event. For instance, the native monitoring application 522 may use the network browser 530 to retrieve a website that describes options for repairing a piece of broken glass and also retrieve business listings for businesses local to the user's property that repair broken glass. The information obtained through the network browser 530 may be automatically displayed to user to assist the user in easily handling the glass break event without having to search for helpful information.

Figure 6:
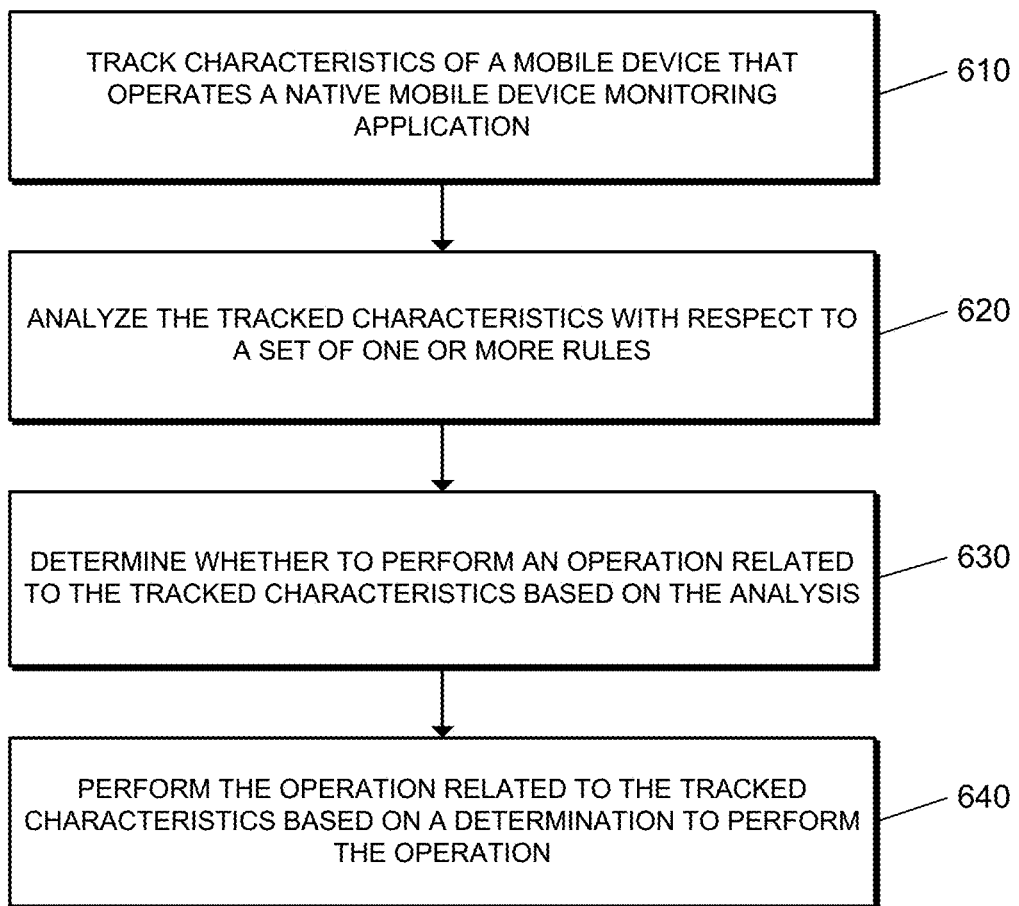

FIG. 6 illustrates an example process 600 for performing an operation related to tracked characteristics of a mobile device that operates a native mobile device monitoring application. The system 100 tracks characteristics of a mobile device that operates a native mobile device monitoring application (610). The system 100 may track any type of one or more characteristics of a mobile device that operates a native mobile device monitoring application. The tracked characteristics may relate to the ability of the mobile device to properly operate as a monitoring (e.g., security) system keypad.

For instance, the system 100 may track a battery level of the mobile device that operates the native mobile device monitoring application. The system 100 also may track a geographic location of the mobile device relative to the property monitored by the monitoring system. The system 100 further may track an ability of the mobile device to communicate, using a short range wireless communication protocol, with a component of the monitoring system located at the property. The system 100 may periodically check each of the tracked characteristics and store data reflecting the tracked characteristics over time.

The system 100 analyzes the tracked characteristics with respect to a set of one or more rules (620) and determines whether to perform an operation related to the tracked characteristics based on the analysis (630). For instance, the system 100 analyzes the tracked characteristics to determine whether an automatic control operation or an alert related to the tracked characteristics is needed. The system 200 may analyze single tracked characteristics and take action according to single tracked characteristics. The set of one or more rules may include various thresholds related to the tracked characteristics that are used to evaluate whether an action is needed.

In implementations in which the system 100 tracks a battery level of the mobile device that operates the native mobile device monitoring application, the system 100 may compare the battery level of the mobile device to a battery level threshold. In these implementations, the system 100 determines to send an alert related to the battery level of the mobile device when the comparison reveals that the battery level of the mobile device is below the threshold. In addition, the system 100 determines that no action is needed when the comparison reveals that the battery level of the mobile device is above the threshold.

In implementations in which the system 100 tracks a geographic location of the mobile device relative to the property monitored by the monitoring system, the system 100 may compare the geographic location of the mobile device to a control area defined proximate to the property. The control area may define a permissible area in which the mobile device may be carried and may be an area that is relatively close to the monitored property. In these implementations, the system 100 determines to send an alert related to the geographic location of the mobile device when the comparison reveals that the geographic location of the mobile device is outside of the control area defined proximate to the property. In addition, the system 100 determines that no action is needed when the comparison reveals that the geographic location of the mobile device is within the control area defined proximate to the property.

In implementations in which the system 100 tracks an ability of the mobile device to communicate, using a short range wireless communication protocol, with a component of the monitoring system located at the property, the system 100 determines whether the mobile device has the ability to communicate, using the short range wireless communication protocol, with the component of the monitoring system located at the property. The system 100 may make the determination based on a geographic location of the mobile device being within a particular distance of the component of the monitoring system located at the property or the system 100 may make the determination based on a signal strength of pinging communications sent, using the short range wireless communication protocol, between the mobile device and the component of the monitoring system located at the property.

In these implementations, the system 100 determines whether to send data from the component of the monitoring system located at the property to the mobile device over a long range network-based communication protocol based on the determination of whether the mobile device has the ability to communicate, using the short range wireless communication protocol, with the component of the monitoring system located at the property. For instance, the system 100 uses the short range wireless communication protocol when possible and changes to the long range network-based communication protocol when the mobile device is determined not to have the ability to communicate, using the short range wireless communication protocol, with the component of the monitoring system located at the property.

The system 100 performs the operation related to the tracked characteristics based on a determination to perform the operation (640). The system 200 may perform several different, types of operations related to the tracked characteristics. For example, the system 200 may automatically, without user intervention, control the mobile device or a component of the monitoring system based on the determination to perform the operation. In another example, the system 200 may send alerts or display suggested changes to a user based on the determination to perform the operation.

For instance, the system 100 may send an alert indicating that the battery level of the mobile device has reached a relatively low level in response to a determination to send the alert related to the battery level of the mobile device. In addition, the system 100 may send an alert indicating that the geographic location of the mobile device has moved outside of the control area defined proximate to the property in response to a determination to send the alert related to the geographic location of the mobile device. Further, the system 100 may send data from the component of the monitoring system located at the property to the mobile device over the long range network-based communication protocol in response to a determination that the mobile device does not have the ability to communicate, using the short range wireless communication protocol, with the component of the monitoring system located at the property.

Figure 7:
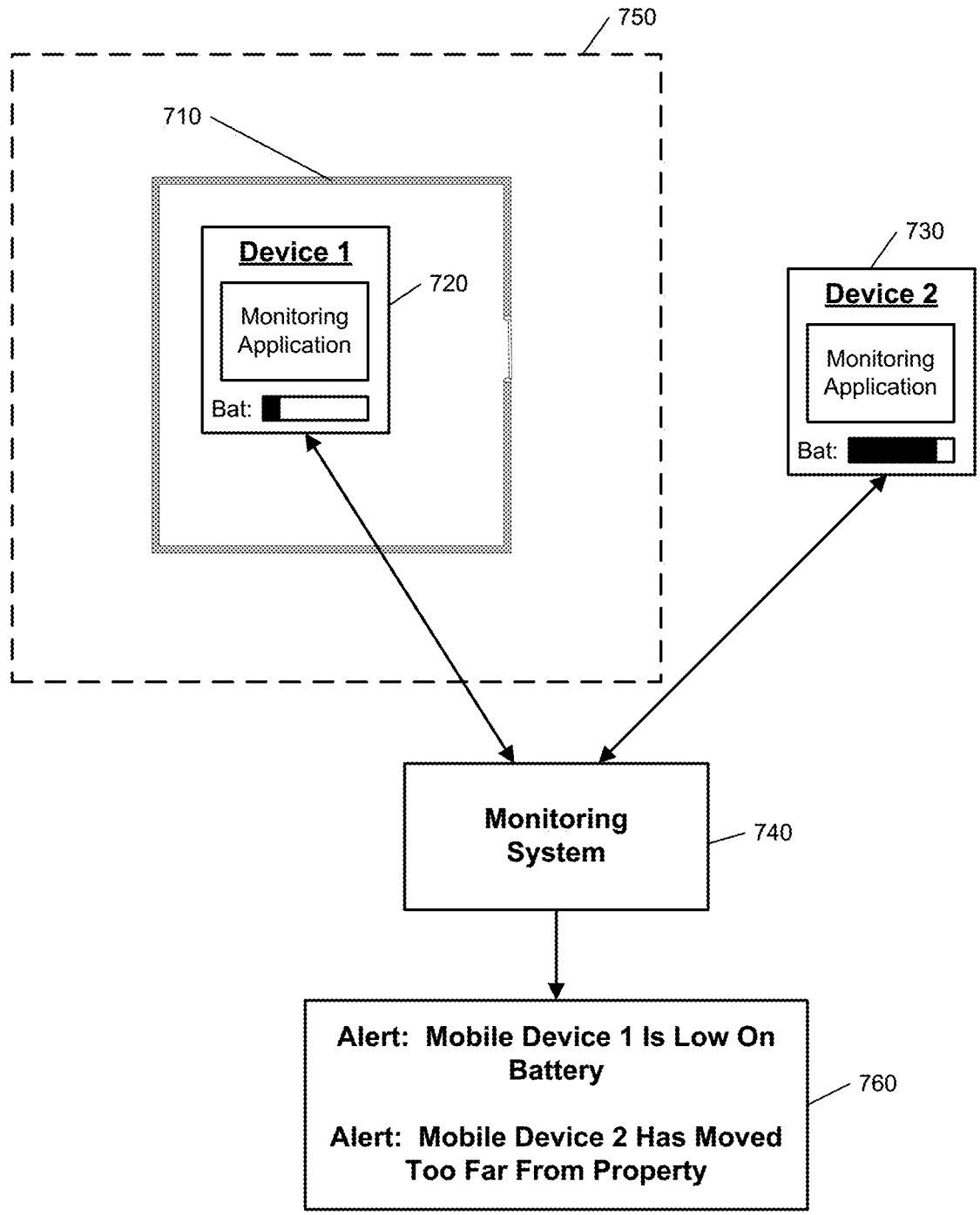
FIGS. 7, 8A, and 8B illustrate examples of performing an operation related to tracked characteristics of a mobile device that operates a native mobile device monitoring application.

FIG. 7 illustrates an example of performing an operation related to tracked characteristics of a mobile device that operates a native mobile device monitoring application. As shown, a property 710 is monitored by a monitoring system 740. A first mobile device 720 includes a monitoring application and has been synchronized with the monitoring system 740 to enable the first mobile device 720 to control monitoring system operations at the property 710. A second mobile device 730 includes a monitoring application and has been synchronized with the monitoring system 740 to enable the second mobile device 730 to control monitoring system operations at the property 710.

The monitoring system 740 tracks characteristics of the first mobile device 720 and the second mobile device 730. For example, the monitoring system 740 tracks a battery level of the first mobile device 720 and the second mobile device 730 and tracks a geographic location of the first mobile device 720 and the second mobile device 730 relative to a control area 750 defined proximate to the property 710. In this example, the monitoring system 740 determines that the first mobile device 720 has a battery level below a threshold, that the first mobile device 720 is within the control area 750, that second mobile device 730 has a battery level above the threshold, and that the second mobile device 730 is outside of the control area 750. In response to these determinations, the monitoring system 740 sends an alert 760 that indicates the first mobile device 720 has a low battery level and that the second mobile device 730 has moved too far from the property (e.g., is outside of the control area 750). The alert 760 may be sent to the first mobile device 720 and the second mobile device 730. The alert 760 also may be sent to another communication device or medium operated by the owner of the property 710. For instance, the alert 760 may be sent as an electronic mail message to an electronic mail address of the owner of the property 710 and/or may be sent as an SMS message to a phone number of the owner of the property 710.

Figure 8A:
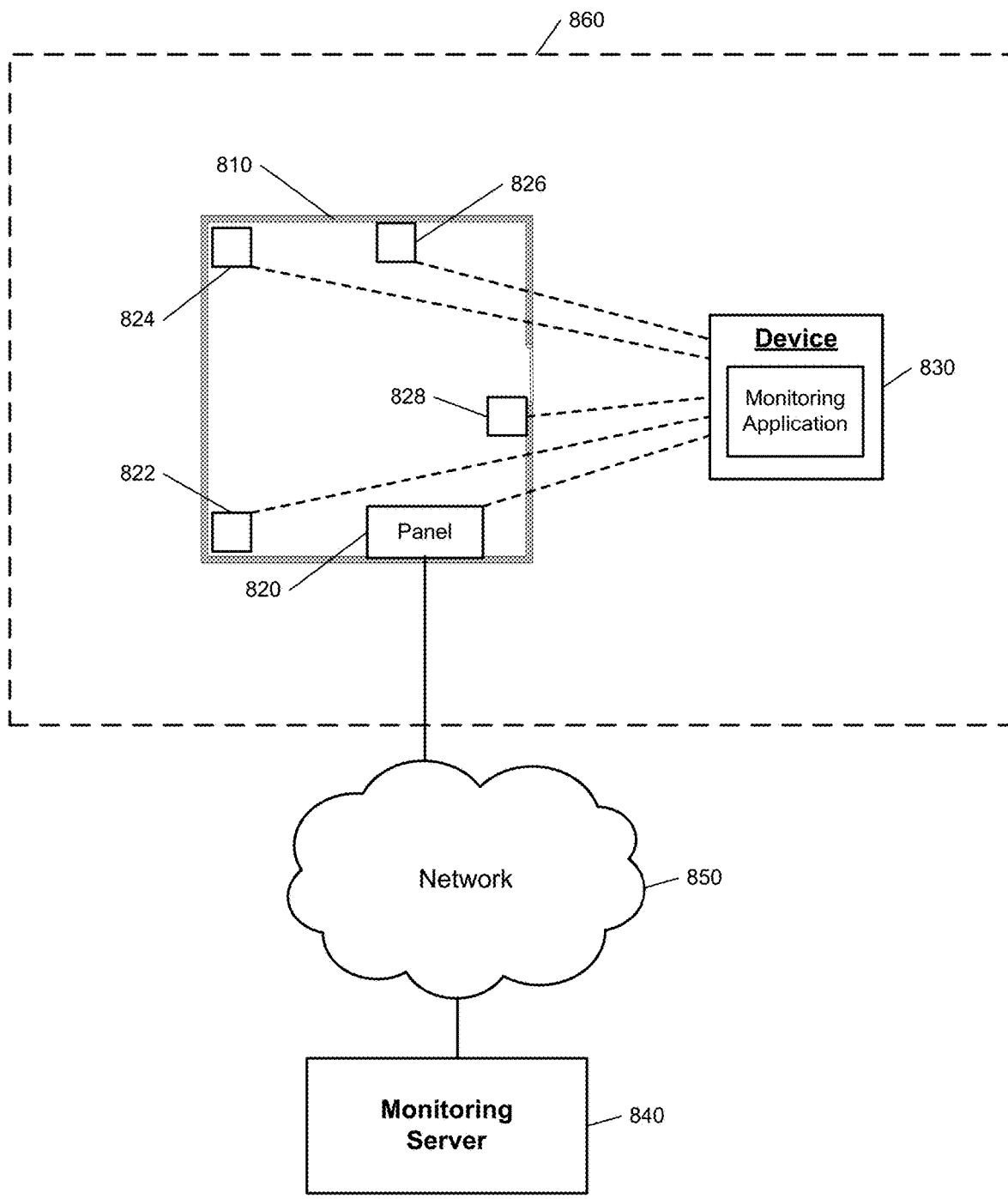
Figure 8B:
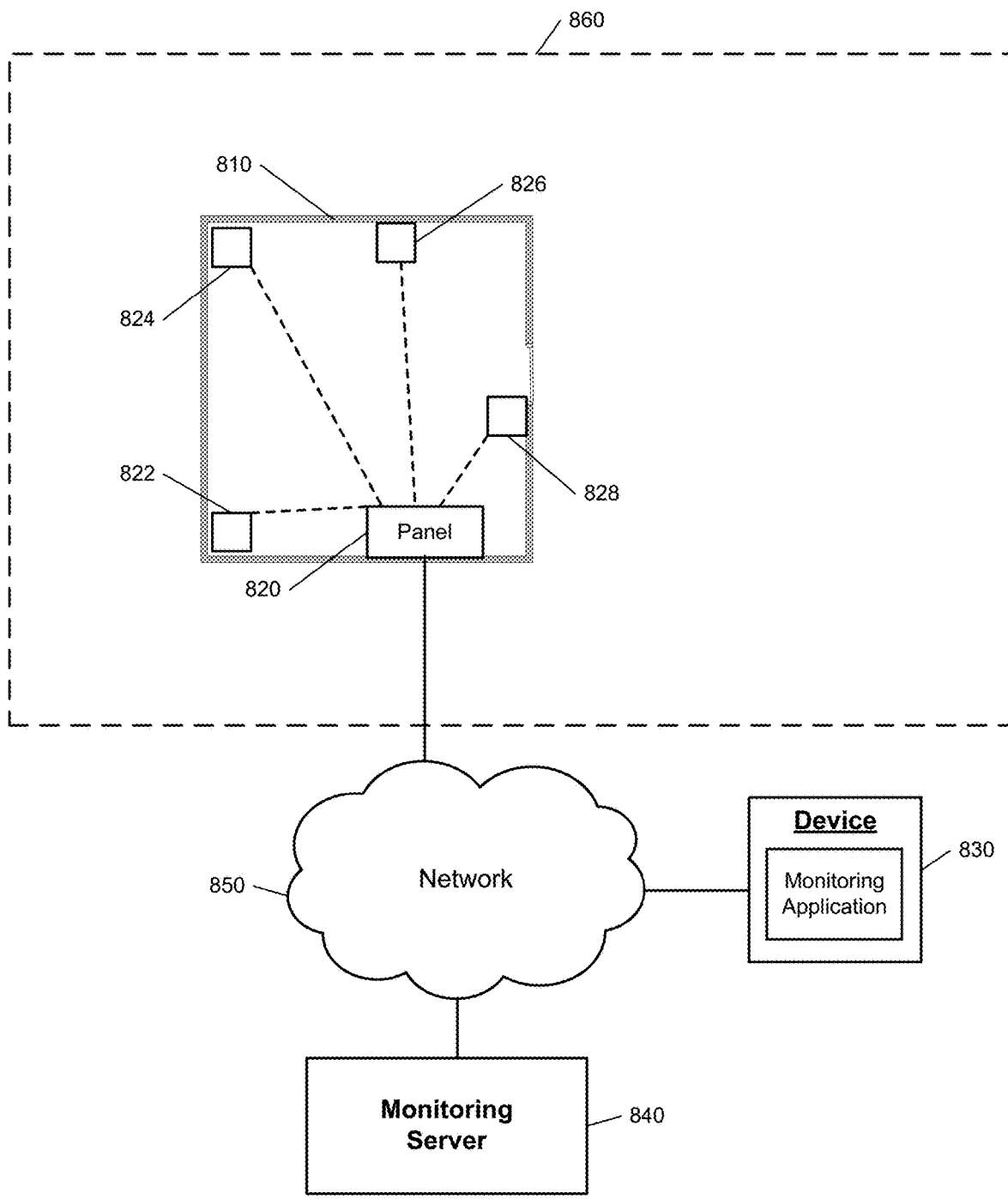

FIGS. 8A and 8B illustrate examples of performing an operation related to tracked characteristics of a mobile device that operates a native mobile device monitoring application. As shown, a property 810 is monitored by a local monitoring system that includes a control panel 820, a motion sensor 822, a camera 824, a window contact sensor 826, and a door contact sensor 828. The local monitoring system may be controlled by a mobile device 830 that operates a native monitoring application. The control panel 820 also communicates with a remote monitoring application server 840 over a network 850. The network 850 may be similar to the network 105 described above with respect to FIG. 1.

In the example shown in FIG. 8A, the mobile device 830 operating the native mobile device monitoring application is positioned within a control area 860 defined proximate to the property 810. Because the mobile device 830 is positioned within the control area 860, the mobile device 830 directly communicates, over a short range wireless protocol, with the control panel 820, the motion sensor 822, the camera 824, the window contact sensor 826, and the door contact sensor 828. In this example, the mobile device 830 operating the native mobile device monitoring application receives all sensor data directly from the sensors and is able to directly control the control panel 820. In this regard, the mobile device 830 directly communicates with the local monitoring system over a local communication pathway.

In the example shown in FIG. 8B, the mobile device 830 operating the native mobile device monitoring application has moved outside of the control area 860 defined proximate to the property 810. Because the mobile device 830 is positioned outside of the control area 860, the mobile device 830 no longer has the ability to communicate with the components of the local monitoring system over the short range wireless communication protocol. As such, the native mobile device monitoring application or the monitoring application server 840 determines that the mobile device 830 no longer has the ability to communicate with the components of the local monitoring system over the short range wireless communication protocol.

In response to this determination, the mobile device 830 begins communicating with the local monitoring system through the monitoring application server 840. Specifically, the motion sensor 822, the camera 824, the window contact sensor 826, and the door contact sensor 828 communicate directly with the control panel 820 and the control panel 820 uses a network communication module to send the sensor data to the monitoring application server 840 over the network 850. The monitoring application server 840 then relays the sensor data to the mobile device 830 over the network 850. Similarly, when the mobile device 830 wishes to control the local monitoring system, the mobile device 830 sends, over the network 850, a control command to the monitoring application server 840 and the monitoring application server 840 relays the control command to the control panel 820.

In the example shown in FIG. 8B, the mobile device 830 indirectly communicates with the local monitoring system over a remote communication pathway. As such, as the mobile device 830 moved out of range of the local monitoring system, the local communication pathway was automatically changed to the remote communication pathway to enable the mobile device 830 to remain in continuous contact with the local monitoring system.

Figure 9:
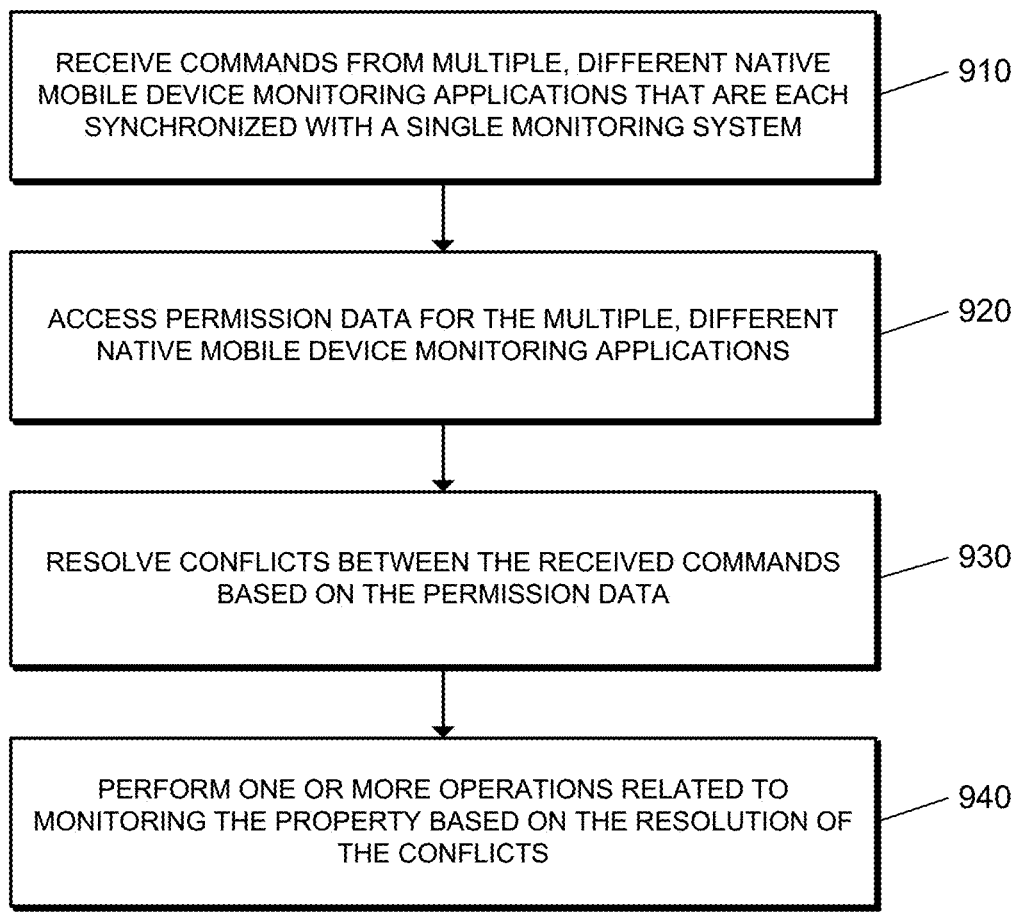

FIG. 9 illustrates an example process 900 for resolving conflicts between multiple, different native mobile device monitoring applications. The system 100 receives commands from multiple, different native mobile device monitoring applications that are each synchronized with a single monitoring system (910). For example, the system 100 receives multiple commands that define control operations to be performed by the single monitoring system. In this example, the system 100 may receive the multiple commands simultaneously (or very close in time, such as within seconds) or may receive the multiple commands spaced over a larger time period (e.g., minutes or hours apart).

The system 100 accesses permission data for the multiple, different native mobile device monitoring applications (920). For example, the system 100 may access, from electronic storage, permission data for the multiple, different native mobile device monitoring applications. The system 100 also may receive permission data for the multiple, different native mobile device monitoring applications. The permission data may define priority order for the multiple, different native mobile device monitoring applications. The priority order may apply generally to commands issued by the multiple, different native mobile device monitoring applications or may apply to specific commands or types of commands issued by the multiple, different native mobile device monitoring applications.

In some implementations, the system 100 may determine whether conflicting commands have been received from multiple, different native mobile device monitoring applications. In these implementations, the system 100 only accesses permission data in response to a determination that conflicting commands have been received.

The system 100 resolves conflicts between the received commands based on the permission data (930) and performs one or more operations related to monitoring the property based on the resolution of the conflicts (940). For instance, when conflicting commands have been received from multiple, different native mobile device monitoring applications, the system 100 analyzes the conflict with respect to the permission data and determines how to resolve the conflict. The system 100 may determine to perform an operation based on one command from the conflicting commands or may determine to perform an operation based on an aggregate of the conflicting commands. For instance, when one native mobile device monitoring application has a highest priority, the system 100 may identify the command received from that native mobile device monitoring application and perform the operation defined by the identified command. In another example, when two native mobile device monitoring applications have the same priority, the system 100 may determine and perform a compromise command that is based on the conflicting commands, but may not exactly match any of the conflicting commands. In one example, the system 100 may determine a compromise command for two conflicting commands that identify a temperature at which to set a thermostat. In this example, the system 100 may determine and perform the compromise command by computing an average of the conflicting temperatures and setting the thermostat at the average of the conflicting temperatures.

When only parts of the received commands conflict, the system 100 may resolve only the conflicting parts of the commands. For example, the system 100 may identify non-conflicting parts of the commands in addition to conflicting parts of the commands and perform all non-conflicting parts of the commands in addition to resolving the conflicting parts of the commands.

Figure 10:
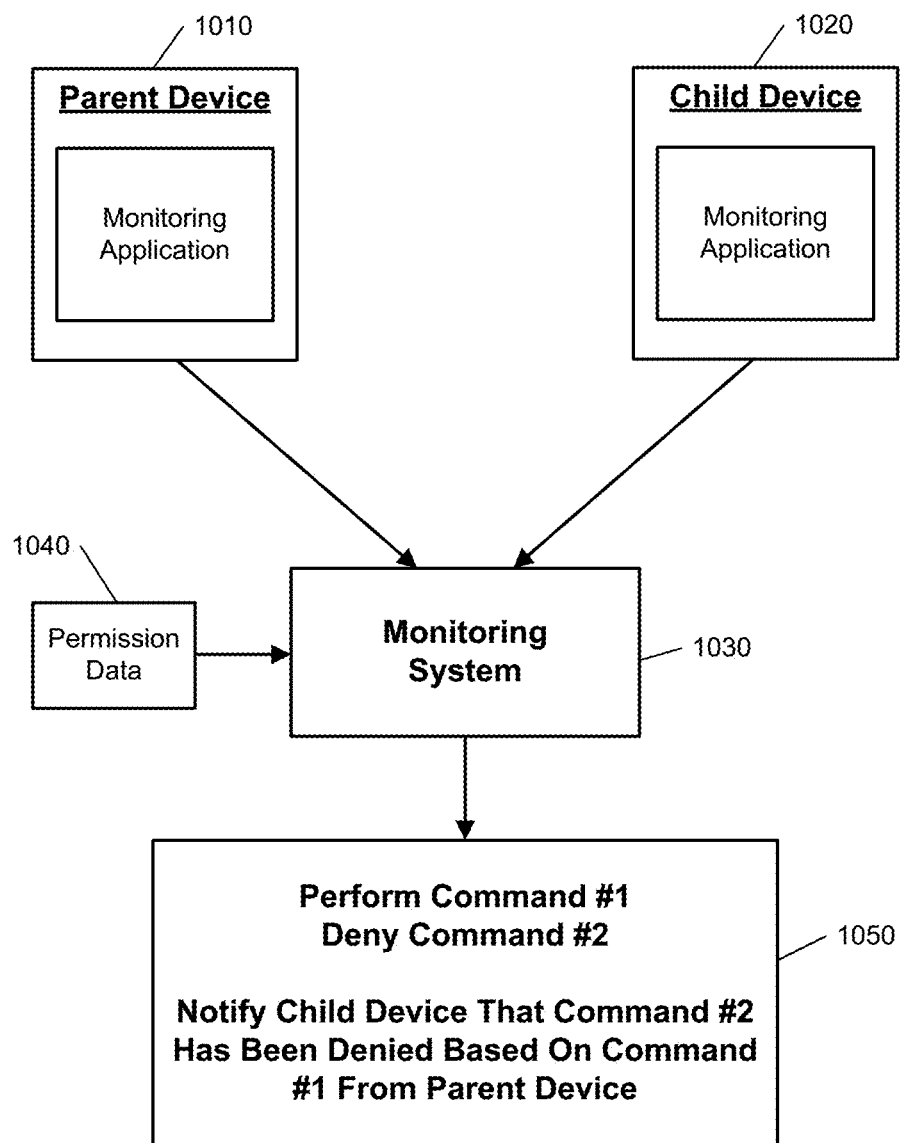
FIG. 10 illustrates an example of resolving conflicts between multiple, different native mobile device monitoring applications.

FIG. 10 illustrates an example of resolving conflicts between multiple, different native mobile device monitoring applications. As shown, a dad mobile device 1010 includes a monitoring application and has been synchronized with the monitoring system 1030 to enable the dad mobile device 1010 to control monitoring system operations at a monitored property. A child mobile device 1020 includes a monitoring application and has been synchronized with the monitoring system 1030 to enable the child mobile device 1020 to control monitoring system operations at the monitored property.

In this example, the monitoring system 1030 receives a first command from the dad mobile device 1010 and a second command from the child mobile device 1020. The monitoring system 1030 may receive the first and second commands simultaneously (or within seconds) or may receive the first command from the dad mobile device 1010 and then receive the second command from the child mobile device 1020 a significant time period later (e.g., one hour later).

The monitoring system 1030 determines that a first control operation defined by the first command from the dad mobile device 1010 conflicts with a second control operation defined by the second command from the child mobile device 1020. In response to identifying the conflict, the monitoring system 1030 accesses permission data 1040 to determine how to resolve the conflict. The accessed permission data 1040 defines a priority between the dad mobile device 1010 and the child mobile device 1020.

In this example, the monitoring system 1030 analyzes the accessed permission data 1040 and determines that the dad mobile device 1010 has a higher priority than the child mobile device 1020. Based on the determination that the dad mobile device 1010 has a higher priority than the child mobile device 1020, the monitoring system 1030 determines to resolve the conflict in favor of the dad mobile device 1010 and perform the first control operation defined by the first command. In this regard, the monitoring system 1030 decides to perform operations 1050, which include performing the first control operation defined by the first command, denying the second command, and sending the child mobile device 1020 a notification that indicates the second command has been denied based on the first command from the dad mobile device 1010.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, in some implementations, a mobile device hosts the entire monitoring system, including all user data, user video, and other data. In these implementations, the mobile device may act without a monitoring application server or another type of monitoring system control panel. The mobile device receives real time inputs from sensors at a monitored property either via long range RF or local RF communications and performs intelligent processing for the monitoring system driving alerts to all other user alert destinations and security alerts to a central monitoring station.

In some examples, the mobile device is authorized to perform operation related to the monitoring system through the use of authorization information, such as tokens. In these examples, the mobile device may receive a time-restricted token, which allows the mobile device to be recognized by the monitoring system. One or more rules may be associated with the token. For instance, the token may specify a time of day (and/or a day of week or a specific date) at which the token is valid, a specific portion of a property at which the token is valid (e.g., the token may be associated with a specific door at the property), and/or a specific command that the token requires (e.g., a specific input code or a specific motion-based gesture signature that the mobile device can detect using an internal gyroscope or accelerometer). If the rules associated with the token are satisfied (e.g., it is the correct time of day, the mobile device is located at the correct door, and the mobile device detects correct performance of a motion-based gesture signature assigned to the token), then the system protecting the property may allow an action associated with the system to be performed. Specifically, the system protecting the property may be disarmed or armed, or other actions may be induced, such as an emergency alert or a panic alert.

In some implementations, the mobile device acts as a security system in a vehicle and recognizes all sensors in the vehicle. In these implementations, when the mobile device is in proximity of the vehicle, the mobile device directly receives and processes notices from the sensors on the vehicle. The mobile device may perform monitoring system operations associated with the vehicle using techniques similar to the monitoring system operations associated with a monitored property discussed throughout this disclosure.

Other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   by a monitoring system for a property that includes one or more sensors:
   detecting an event for the property;
   determining a first set of capabilities of a device other than devices included in the monitoring system and that is executing a monitoring application for the monitoring system, wherein a) the monitoring application enables the device to control one or more operations of the monitoring system and b) the device has a plurality of sets of capabilities including i) a second, different set of capabilities of the monitoring application, and ii) the first set of capabilities;
   in response to detecting the event for the property, selecting, using at least some of the first set of capabilities of the device, one or more automated actions; and
   performing the one or more automated actions.

2. The method of claim 1, comprising determining whether the device is currently located at the property, wherein:
   determining the first set of capabilities comprises determining that the device includes a camera; and
   performing the one or more automated actions comprises, in response to determining that the device is currently located at the property and detecting the event for the property:
   sending, by the monitoring system and to the device, one or more commands to cause the camera included in the device to capture one or more images at the property; and
   in response to sending the one or more commands, receiving, by the monitoring system and from the device, the one or more images.

3. The method of claim 2, wherein sending the one or more commands comprises sending the one or more commands to the device to cause the camera to capture the one or more images of a likely intruder at the property.

4. The method of claim 1, comprising determining whether the device is currently located at the property, wherein:
   determining the first set of capabilities comprises determining that the device includes a speaker; and
   performing the one or more automated actions comprises, in response to determining that the device is currently located at the property:
   sending, by the monitoring system and to the device, one or more commands to cause the speaker included in the device to present an audio signal about the event.

5. The method of claim 1, comprising determining that the device is currently located at the property, wherein:
   determining the first set of capabilities comprises determining that the device is able to communicate with a remote system separate from the property and the device; and
   performing the one or more automated actions comprises:
   communicating, using the device that is able to communicate with the remote system separate from the property and the device, with the remote system separate from the property in response to i) detecting the event for the property, ii) determining that the device is currently located at the property and iii) determining that the device is able to communicate with a remote system separate from the property and the device.

6. The method of claim 5, wherein the remote system comprises a monitoring application server or a central alarm station server.

7. The method of claim 1, wherein:
   performing the one or more automated actions comprises, communicating, by the monitoring system and using a messaging application installed on the device, with another device.

8. A monitoring system comprising one or more computers and one or more storage devices on which are stored instructions that are operable, when executed by the one or more computers, to cause the one or more computers to perform operations comprising:
   detecting an event for a property;
   determining a first set of capabilities of a device other than devices included in the monitoring system and that is executing a monitoring application for the monitoring system, wherein a) the monitoring application enables the device to control one or more operations of the monitoring system and b) the device has a plurality of sets of capabilities including i) a second, different set of capabilities of the monitoring application, and ii) the first set of capabilities;

in response to detecting the event for the property, selecting, using at least some of the first set of capabilities of the device, one or more automated actions; and
performing the one or more automated actions.

9. The system of claim 8, the operations comprising determining whether the device is currently located at the property, wherein:
determining the first set of capabilities comprises determining that the device includes a camera; and
performing the one or more automated actions comprises, in response to determining that the device is currently located at the property and detecting the event for the property:
sending, to the device, one or more commands to cause the camera included in the device to capture one or more images at the property; and
in response to sending the one or more commands, receiving, from the device, the one or more images.

10. The system of claim 9, wherein sending the one or more commands comprises sending the one or more commands to the device to cause the camera to capture the one or more images of a likely intruder at the property.

11. The system of claim 8, the operations comprising determining whether the device is currently located at the property, wherein:
determining the first set of capabilities comprises determining that the device includes a speaker; and
performing the one or more automated actions comprises, in response to determining that the device is currently located at the property:
sending, to the device, one or more commands to cause the speaker included in the device to present an audio signal about the event.

12. The system of claim 8, the operations comprising determining whether the device is currently located at the property, wherein:
determining the first set of capabilities comprises determining that the device is able to communicate with a remote system separate from the property and the device; and
performing the one or more automated actions comprises:
communicating, using the device that is able to communicate with the remote system separate from the property and the device, with the remote system separate from the property in response to i) detecting the event for the property, ii) determining that the device is currently located at the property and iii) determining that the device is able to communicate with a remote system separate from the property and the device.

13. The system of claim 12, wherein the remote system comprises a monitoring application server or a central alarm station server.

14. The system of claim 8, wherein:
performing the one or more automated actions comprises, communicating, using a messaging application installed on the device, with another device.

15. A non-transitory computer storage medium encoded with instructions that, when executed by one or more computers, cause the one or more computers to perform operations comprising:
by a monitoring system for a property that includes one or more sensors:
detecting an event for the property;
determining a first set of capabilities of a device other than devices included in the monitoring system and that is executing a monitoring application for the monitoring system, wherein a) the monitoring application enables the device to control one or more operations of the monitoring system and b) of the monitoring application, and ii) the first set of capabilities;
in response to detecting the event for the property, selecting, using at least some of the first set of capabilities of the device, one or more automated actions; and
performing the one or more automated actions.

16. The computer storage medium of claim 15, the operations comprising determining whether the device is currently located at the property, wherein:
determining the first set of capabilities comprises determining that the device includes a camera; and
performing the one or more automated actions comprises, in response to determining that the device is currently located at the property and detecting the event for the property:
sending, to the device, one or more commands to cause the camera included in the device to capture one or more images at the property; and
in response to sending the one or more commands, receiving, from the device, the one or more images.

17. The computer storage medium of claim 16, wherein sending the one or more commands comprises sending the one or more commands to the device to cause the camera to capture the one or more images of a likely intruder at the property.

18. The computer storage medium of claim 15, the operations comprising determining whether the device is currently located at the property, wherein:
determining the first set of capabilities comprises determining that the device includes a speaker; and
performing the one or more automated actions comprises, in response to determining that the device is currently located at the property:
sending, to the device, one or more commands to cause the speaker included in the device to present an audio signal about the event.

19. The computer storage medium of claim 15, the operations comprising determining whether the device is currently located at the property, wherein:
determining the first set of capabilities comprises determining that the device is able to communicate with a remote system separate from the property and the device; and
performing the one or more automated actions comprises:
communicating, using the device that is able to communicate with the remote system separate from the property and the device, with the remote system separate from the property in response to i) detecting the event for the property, ii) determining that the device is currently located at the property and iii) determining that the device is able to communicate with a remote system separate from the property and the device.

20. The computer storage medium of claim 19, wherein the remote system comprises a monitoring application server or a central alarm station server.

21. The computer storage medium of claim 15, wherein:
performing the one or more automated actions comprises, communicating, using a messaging application installed on the device, with another device.

* * * * *